United States Patent [19]

Oulid-Aissa et al.

[11] Patent Number: 5,721,909
[45] Date of Patent: Feb. 24, 1998

[54] DISTRIBUTED DATABASE ARCHITECTURE AND DISTRIBUTED DATABASE MANAGEMENT SYSTEM FOR OPEN NETWORK EVOLUTION

[75] Inventors: Mourad Oulid-Aissa, Boca Raton; Charles Allen Cole, Coral Springs; Simon Edwin Tavanyar, Altamonte Springs, all of Fla.

[73] Assignee: Siemens Stromberg-Carlson, Boca Raton, Fla.

[21] Appl. No.: 739,737

[22] Filed: Nov. 7, 1996

Related U.S. Application Data

[63] Continuation of Ser. No. 678,451, Jul. 3, 1996, abandoned, which is a continuation of Ser. No. 221,320, Mar. 30, 1994, abandoned.

[51] Int. Cl.$^6$ ...................................................... G06F 17/30
[52] U.S. Cl. ............................ 395/610; 395/614; 395/617
[58] Field of Search .................................... 395/610, 614, 395/617

[56] References Cited

U.S. PATENT DOCUMENTS

| | | | |
|---|---|---|---|
| 4,635,189 | 1/1987 | Kendall | 395/600 |
| 4,769,772 | 9/1988 | Dwyer | 395/600 |
| 4,774,661 | 9/1988 | Kumpati | 395/600 |
| 4,972,367 | 11/1990 | Burke | 364/900 |
| 5,058,000 | 10/1991 | Cox et al. | 364/200 |
| 5,185,887 | 2/1993 | Takahishi et al. | 395/600 |
| 5,193,110 | 3/1993 | Jones et al. | 379/94 |
| 5,278,978 | 1/1994 | Demers et al. | 395/600 |
| 5,329,626 | 7/1994 | Klein et al. | 395/375 |
| 5,345,587 | 9/1994 | Fehskens et al. | 395/650 |
| 5,374,234 | 12/1994 | Davidson et al. | 395/600 |
| 5,377,309 | 12/1994 | Sonobe et al. | 395/76 |
| 5,448,634 | 9/1995 | Satomi et al. | 379/220 |
| 5,469,503 | 11/1995 | Butensky et al. | 379/265 |

(List continued on next page.)

FOREIGN PATENT DOCUMENTS

0490465 A3  6/1972  European Pat. Off. .

OTHER PUBLICATIONS

Pons et al, "A Dynamic and Integrated Concurrency Control for Distributed Databases", IEEE J. on Selected Areas in Comm., vol. 7, No. 3, Apr. 1989 pp. 364–374.

Agrawal et al, "Modular Synchronization in Distributed Multiversion Databases: Version Control and Concurrency Control", IEEE Trans. on Knowledge and Data Engineering, vol. 5, No. 1, Feb. 1993, pp. 126–137.

"Transaction Management in the R* Distributed Database Management System", C. Mohan et al., ACM Transactions on Database Systems, vol. 11, No. 4, Dec., 1986, pp. 378–396.

"A Taxonomy and Current Issues in Multidatabase Systems", M.W. Bright et al., IEEE Computer, Mar. 1992, pp. 50–59.

"Introduction to a System for Distributed Databases (SDD-1)", J.B. Rothnie, Jr. et al., ACM Transactions on Database Systems, vol. 5, No. 1, Mar. 1980, pp. 1–17.

(List continued on next page.)

*Primary Examiner*—Wayne Amsbury
*Attorney, Agent, or Firm*—Joseph S. Codispoti

[57] ABSTRACT

A distributed database management (DDBMS) system for switching applications that combines rapid feature deployment with high real-time performance. The system architecture encompasses a new software boundary between application and database, yet provides the benefits of open standard interfaces and distributed transaction control. To accomplish this dichotomy, an object-oriented schema is used to arrange the DDBMS as an intelligent service provider, separating services from physical location and implementation. A software containment approach is utilized to optimize interfaces based on grouping of data so as to permit application-specific routines to be "plugged-into" the database. The DDBMS is arranged to address extendibility and real-time performance needs of capabilities such as ISDN and IN is switching offices and network nodes.

6 Claims, 16 Drawing Sheets

U.S. PATENT DOCUMENTS

| | | | |
|---|---|---|---|
| 5,377,350 | 12/1994 | Skinner | 395/600 |
| 5,379,424 | 1/1995 | Morimoto et al. | 395/600 |
| 5,388,258 | 2/1995 | Larsson et al. | 395/600 |
| 5,402,474 | 3/1995 | Miller et al. | 379/93 |

OTHER PUBLICATIONS

"An Interactive Graphics Editor With Integrated Data Dictionary for $IDEF_o$ Structured Analysis Diagrams", Hartrum et al., IEEE, 1988, pp. 765–770.

"Application Program Interface Design Based on On–Line Processing Types", Nakatani et al. IEEE, Apr. 1992, pp. 517–524.

"An Interface for Rapid Prototyping and Evolutionary Support of Database–Intensive Applications", Kevin Lynch et al., IEEE, Jun. 1989, pp. 344–348.

"Four References Architectures for Distributed Database Management Systems", James A. Larson, Computer Standards and Interfaces vol. 9, No. 3, Jan. 1, 1989, pp. 209–221.

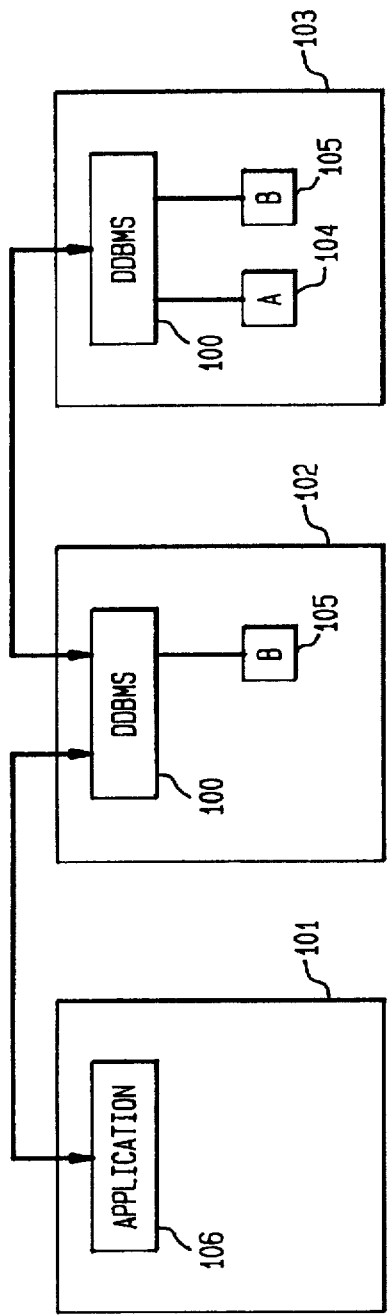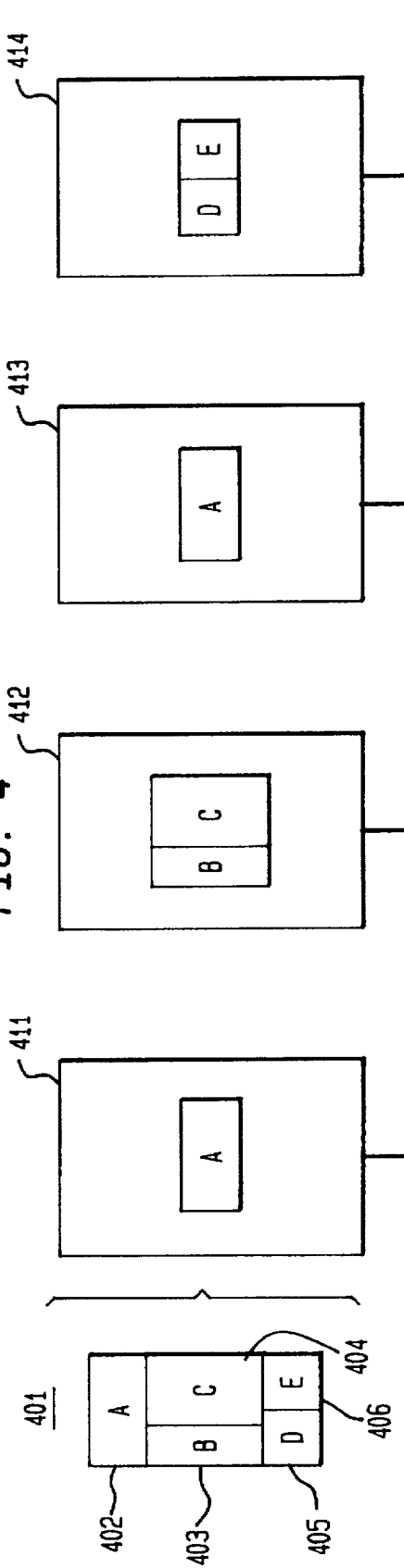

DISTRIBUTED DATABASE ARCHITECTURE AND DISTRIBUTED DATABASE MANAGEMENT SYSTEM FOR OPEN NETWORK EVOLUTION

CROSS REFERENCE TO RELATED APPLICATION

This is a continuation of Ser. No. 08/678,451 filed Jul. 3, 1996 now abandoned which is a continuation of Ser. No. 08/221,320 filed Mar. 30, 1994, now abandoned.

BACKGROUND OF THE DISCLOSURE

1. Field of the Invention

This invention relates to a distributed database management system (DDBMS) and, more particularly, to a DDBMS utilized in a public switching environment to effect real-time processing and to facilitate service creation.

2. Description of the Background Art

Recently the extensive research and development efforts focusing on distributed database systems have produced significant break-throughs. This, in turn, has culminated in a number of first-generation products presently being introduced commercially.

In a broad sense, the term database (DB) refers to a collection of related data. A distributed database is a collection of multiple, logically interrelated databases distributed over a computer-based system. A distributed database management system (DDBMS) refers to the software system that permits managing of the distributed database in such a way to make the distribution transparent to the users. Distributed database technology generally has the following important characteristics/advantages: (1) data is stored at a number of sites, also referred to as nodes; (2) the processors at nodes are interconnected by a computer network rather than a multiprocessor configuration; (3) the distributed database is indeed a true database, not a collection of files that can be stored individually at each node; and (4) the overall system has the full functionality of a database management system. However, at least with respect to commercially available DDBMSs, each DDBMS is essentially disk-based rather than memory-resident, thereby slowing database operations. Also, during transaction/control operations, the commercial DDBMSs handle all data in the same manner, with no attempt to distinguish data of a transient nature from semi-permanent data. Finally, commercial products are specific to a particular operating system (platform), and are not easily "ported" to other platforms. (Of course, proprietary solutions may not have these limitations but obviously the details are essentially unavailable/unknown).

More detailed information relating to DDBMSs in a commercial computing network environment may be found in the literature, such as the text "Object Data Management", written by R. G. G. Cattell and published by Addison-Wesley, 1991. Recent journal articles that provide expositions representative of the general approach to designing and implementing distributed database technology include the following: (a) "An Introduction to Distributed Database Systems," by M. A. Newton, dated Dec. 11, 1992, IEE Colloquium on 'Distributed Databases' (Digest No. 229); and (b) "Distributed Database Systems: Where are We Now?", by M. T. Ozsu, dated August, 1991, Computer, Vol. 24, Issue 8. The latter article is particularly informative in tracing the historical development of distributed database technology, including DDBMSs. However, the available literature merely addresses DDBMS issues as they relate to specific, individual computer operating systems/platforms. The following exposition places in perspective the shortcomings and limitations of the DDBMS approaches heretofore presented in the literature when applied to the public switching environment.

In order to support call processing feature capabilities such as the Integrated Services Digital Network (ISDN) and the Intelligent Network (IN), public switching systems and associated network nodes must effectively and efficiently manage global data and information pertaining to network configuration and service relationships. This information and data have typically been arranged in the form of an on-line database in conventional public switching systems. A database management system (DBMS) then effects the call processing and the system maintenance applications by providing real-time access to the data and information.

The conventional approach in arranging switching system architectures has been to closely couple or bind both the database and the application, especially in applications wherein real-time operation is the concern, in an attempt to satisfy the primary objective of optimizing data access time. However, this strategy of binding the application to the database has a number of significant disadvantages, namely: (1) data restructuring is only possible by modifying both the database and the application(s); (2) interfaces to the database are application-specific and therefore do not easily support data management requirements such as set forth in the CCITT Recommendation "Principles for a Telecommunications Management Network" (TMN); and (3) the database software resident in the applications may not be readily reused for other diverse applications. Thus, the results of this conventional strategy lead to higher development cost, more complex software, and poor database stability and extendibility.

Accordingly, one essential challenge in structuring both the applications and the database in an architecture particularly relevant to public switching networks is that of producing DBMS software that is efficient, yet easy-to-use and extendible. Such DBMS software must therefore support a friendly application interface, and moreover accommodate incremental changes of features (extendibility), quickly and at competitive cost. Moreover, the DBMS software must support new requirements such as "all-or-nothing" transactions—for example, execution of an update transaction to combine subscriber features with physical access terminations. The objectives then are to define: (i) a software arrangement with key application transparencies; and (ii) an optimizing strategy hidden from the application user/programmer. To meet these objectives, the approach of the present inventive subject matter is one of using a Distributed DBMS for switching system computing—an approach which heretofore has not been exploited for public switching.

From an application viewpoint, a DDBMS must provide, in addition to efficient data definition and access, an interface to database services supporting true distributed transparencies, including the following transparencies: (a) service location; (b) data location; (c) fragmentation; (d) copy; and (e) transaction. This viewpoint is depicted below in FIG. 1, as now described.

With respect to service location transparency, an application 106 may not be co-located with the DDBMS 100. But, an application must be allowed to communicate with the DDBMS in any remote node without concern for which node it is—one with or one without the DDBMS. Thus, in FIG. 1, an application request to Node 102 must lead to the same result as a request to Node 103.

With respect to data location transparency, an application must be able to invoke data by a request name without concern for the location of the data. The reference request refers to a logical view which the DDBMS maps to distributed data. In FIG. 1, for example, the request "View C" as issued from application 106 of Node 101 requires the combination of data A (104) with data B (105), which is replicated in Nodes 102 and 103. Upon the calling application invoking the View C, the DDBMS logically merges data A with data B: by having Node 102 interact with Node 103 to extract remote data A: by combining remote data A and local data B; and finally by providing the result of the view request to the application 106 in Node 101.

With respect to fragmentation transparency, an application must not be aware of data partitions resulting from a database-specific organization process. At transaction time, an application only needs to know the data names it normally uses. If data is partitioned, the DDBMS recognizes it and recombines the needed data elements. In FIG. 1, the application 106 is not aware that View C really is composed of data elements A and B.

With respect to copy transparency, an application must not be aware of data replications in two or more nodes resulting from a database distribution process. The DDBMS chooses any single instance of the needed data it judges appropriate on the conditions. In FIG. 1, the DDBMS uses the copy of data B in Node 102.

With respect to transaction transparency, the DDBMS must support "all-or-nothing" transactions composed of several read and write operations on distributed, included replicated, data. In FIG. 1, a transaction using the result of View C might translate into "update A, and update B" completely, and if this cannot be accomplished at this instant, then not at all. The application 106 need not concern itself with internal steps of the DDBMS to prepare the transaction across nodes, and to execute the transaction.

These requirements are difficult to achieve through conventional, non-proprietary solutions since each such solution, as alluded to above, is generally specific to a given operating environment/platform, and cannot be readily ported into the specialized, real-time environment of public switching.

The art is devoid of teachings or suggestions pertaining to a DDBMS architecture for switching system computing and operation, to which the present inventive subject matter is directed. The art is thus further devoid of a DDBMS for implementing new technology or services fostering an open DDBMS architecture.

SUMMARY OF THE INVENTION

These shortcomings and other limitations and deficiencies of the conventional arrangements are obviated in accordance with the present invention by a distributed system architecture which utilizes an object-oriented view of data that emphasizes services rather than focusing on access to data. The resultant architecture arranges the DDBMS as a collective service provider wherein logical services are separated from their physical location as well as their implementation.

Broadly, to achieve transparency requirements, the DDBMS architecture is layered so as to decouple applications from database internals. Structure transparency is achieved through the use of services which export names, but not physical data. True distributed transparencies—service/data location, fragmentation/copy and transaction—are supported through service addressing, coupled with distributed transaction processing and a replicated data dictionary.

Broadly, to achieve real-time efficiency requirements, the DDBMS architecture uses software containment and data grouping as the controlled mechanisms for optimizing interfaces. In addition, call processing service access algorithms can be plugged into the database access layer, thus resulting in efficient actions on objects while still achieving modularity of software routines.

Broadly, the circuitry and concomitant method aspects of the present invention set forth a distributed database management system operating in a public switching system for servicing a transaction request as invoked from an application. The distributed database management system is arranged to cooperatively execute in conjunction with the public switching system, and the management system includes three functional layers, namely, a database interface module, a data dictionary, and a database access module. The database interface module, which is responsive to the application, transforms the transaction request to a database request. The data dictionary, coupled to the database interface module, interprets the database request to obtain database data, corresponding to the database request, as contained in the data dictionary. The database access module, coupled to the database interface module and the data dictionary, operates on the database data to produce a database response and then returns the database response to the database interface module. Finally, the database interface module transforms the database response to a transaction response and returns the transaction response to the application.

The transparency and efficiency features of the DDBMS architecture result in a software environment that is efficient, stable, and easily extendible. The architecture is well-suited to address: (1) new feature requirements for growing telecommunication services, such as Broadband ISDN and IN; and (2) open network standards, such as TMN, which are evolving to support the global provisioning and management of these services.

BRIEF DESCRIPTION OF THE DRAWINGS

The teachings of the present invention can be readily understood by considering the following detailed description taken in conjunction with the accompanying drawings, in which:

FIG. 1 is a high-level block diagram of a computer network having a Distributed Database Management System (DDBMS) to provide data location transparency, service location transparency, fragmentation transparency, copy transparency, and transaction transparency;

FIG. 4 depicts the partitioning of object classes into logical files;

To facilitate understanding, identical reference numerals have been used, where possible, to designate identical elements that are common to the figures.

DETAILED DESCRIPTION

After considering the following description, those skilled in the art will clearly realize that the teachings of our invention can be readily utilized in providing public switching services. In order to introduce the broad principles in accordance with the present invention, an overview description is first presented. This approach has the advantage of introducing notation and terminology useful in understanding the details of the present invention. After the overview, a second pass through the description provides intermediate level details with a focus on architecture. Finally, a third pass through the description with a focus on flow control provides the completed description of the present invention.

OVERVIEW

1. System Characteristics

To satisfy the diverse requirements set forth in the Background Section for a real-time public switching environment, the DDBMS utilizes a computational implementation which exhibits both transparency and efficiency. Transparency is effected by: functional layering; service addressing; and distributed transaction processing. Efficiency is effected by: data grouping; "plug-in" services; and software containment. Each of these aspects is now elucidated.

Figure 2:
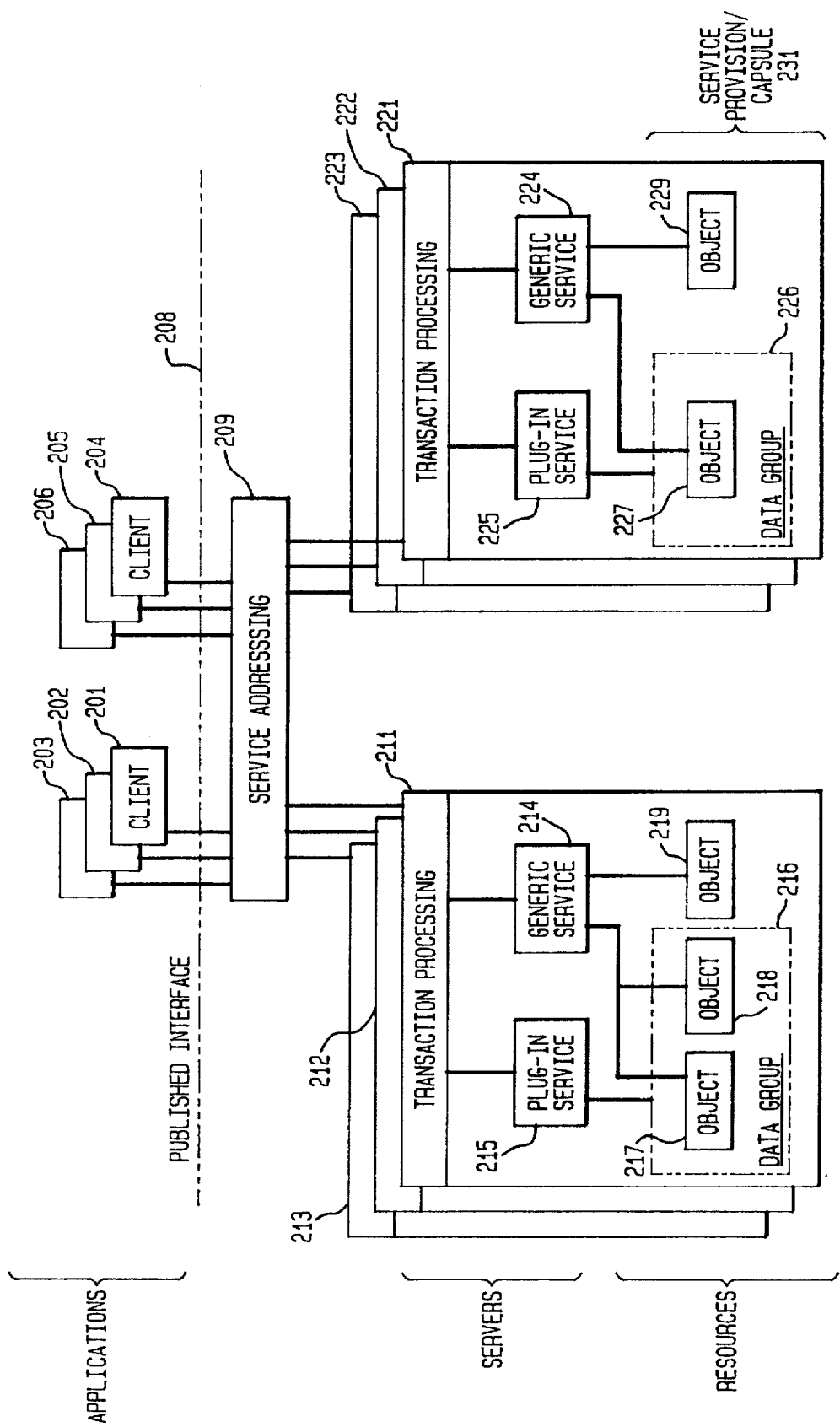
FIG. 2 is a high-level block diagram of the DDBMS depicting the application-server-resource layered functionality of the DDBMS in accordance with the present invention.

With respect to functional layering, the approach is to separate applications and data services along the application-server-resource layers shown in FIG. 2 for a single node. An interface represented by dotted line 208 provides client applications 201–206 full access to data but shields the internal database management complexities and the physical data. New database requirements impacting data structures, contents, or access techniques may then be added without impact to the applications. This ability to add new features is vital for supporting varying market needs and software variants. In the arrangement of FIG. 2, a "service" is a function recognized by "service" name and is defined by a set of allowed operations under a published interface. For the DDBMS, the published interface 208 is defined for generic access operations such as, for concreteness, 'get object', 'create object', or service operations like 'interrogate subscriber profile', 'translate address', or 'allocate idle trunk.' The published interface 208 for database services utilizes an industry standard protocol, so that access requirements from IN, TMN, and other open architectures can be supported. The Common Management Information Protocol (CMIP) is well-suited to these requirements. The three-layer architecture creates a structure transparency which protects the DDBMS itself from internal changes in data representation. In particular, logical access routines need not change when physical records are restructured, or when new file accesses are imposed.

With respect to service addressing, the communication aspect of the architecture enables client applications 201–206 to request data services as if they were offered centrally, when in fact they could be local, remote, or even replicated. This indirection is provided by a steering function in service addressing module 209 which tracks the location of data. In effect, each server 211–213 and 221–223 lists in a central registry the services it provides, and a client application 201–206 requiring a particular service accesses the registry to determine the server that provides the particular service. Service addressing module 209 thus allows data to be dynamically migrated, replicated, or partitioned without affecting application code. Moreover, if the system is to be enhanced, a new database server can be quickly switched from the old to new without affecting applications 201–206.

With respect to distributed transaction processing, the approach is based on the requirements for commitment, concurrency, and recovery (as described by ISO). The approach is to offer basic services which ensure the consistency of the distributed database. For any database service, distributed transaction processing ensures that an application-defined sequence of read and update (write) operations (a "transaction"), is performed in a consistent manner. Thus, a transaction transfers the distributed database from one consistent state into another consistent state.

With respect to data grouping, which achieves the foregoing transparencies and is a flexible technique for optimizing real-time performance, two arrangements are defined to provide all the data needed for one particular access so as to avoid bottlenecks, namely:

(1) partitioning where sets of data are separated into subsets and assigned specific value ranges—for example, a data group 216 might be a set of subscriber 'directory numbers' represented by object 217 and an associated 'business group' (object 218), while another data group (object 219 alone) might be a set of 'equipment numbers' of physical access ports; and (2) replicating an entire data group—for example, 'equipment numbers' as represented by objects 219 and 229.

With respect to "plug-in" services such as shown by elements 215 and 225, specific manipulation logic such as search algorithms, are "plugged-into" the database servers 211 or 221 with the objects these servers access. For example, a call processing application might invoke a special action such as a search on a new trunk group (GET_TRUNK) represented by object 227. The DDBMS then accesses the specified data and triggers a hunt for free trunks based on the "plugged-in" searching technique. This approach results in a clean separation of application state logic and data access code.

With respect to software containment, the database architecture is realized as a set of software containers, with rules for their construction and interaction. The primary container is the "service provision unit" part of element 231. This unit encapsulates client and server processes as well as resources, and is used in the DDBMS as the container for data groups. Thus, subscriber 'directory number' and 'call type' might be grouped in a single service provider. Network routing data is exemplary of another group. The containment approach is chosen carefully to allow efficient communication within a container boundary. For instance, all interfaces within a service provider unit can be realized as local procedure calls.

Another container of importance is the "capsule" part of element 231, which is an area of memory protection comprising one or more service providers. The service interfaces are composed of Cast and Remote procedure call messages, but within a capsule, these messages can be optimized at build time to local procedure calls.

2. DDBMS Software Architecture

Figure 3:
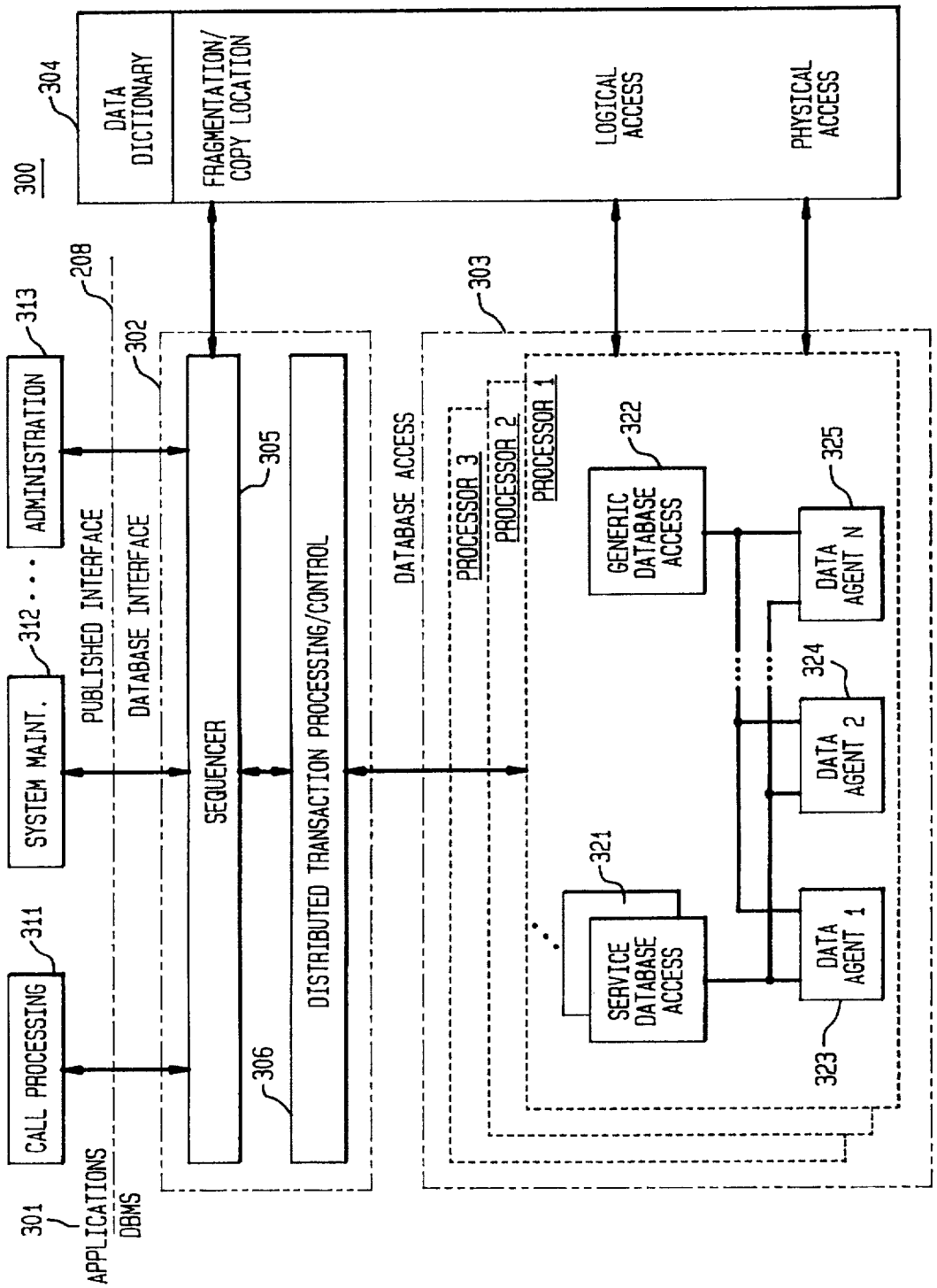
FIG. 3 is a block diagram illustrating the DDBMS software architecture in accordance with the present invention.

The DDBMS 300 architecture which exhibits the characteristics/transparencies highlighted above is illustrated in high-level block diagram form in FIG. 3. The software partitioning and the main software units are now described.

Internally, the DDBMS software is partitioned as follows:

(a) Database interface (DBIF) 302: receives, interprets and handles, i.e., transforms application requests, locates required data, controls concurrent transactions, and provides necessary software management;

(b) Database access (DAC) 303: provides read/write data access through "data agents";

(c) Data Dictionary (DDI) 304: represents data in two ways—(i) logical representation (or view) defining how applications 301 want to see the data; and (ii) physical representation indicating how data is physically stored. This representation provides the benefit that changes in data definitions can be localized.

The database interface 302 and the data dictionary 304 are replicated in every appropriate node.

(A) Database Interface 302

The applications (generically referred to by reference numeral 301), including call processing 311, system maintenance 312, and administration 313, access all DDBMS services through sequencer 305 which supports an object-based language; sequencer 305 is the front-end processor of DBIF 302. Sequencer 305 interprets application requests, locates required data (local and remote), and deals with distributed views as needed. Sequencer 305 then invokes lower-level database services, such as concurrency-transaction control and database accessing (not shown), both of which will be described in more detail later.

A distributed transaction processing and control (DTP/C) software module 306 handles parallel "reads" and "updates" to the same object, and recovery from failure of nodes and communications. The requires that at a consistency requires that all updates of a transaction be done completely (commitment), or not at all (rollback), across distributed data. A multi-phase commit protocol ensures such consistency. The DTP/C module 306 utilizes the following techniques for concurrency of parallel transactions: (1) an optimistic technique, for data updated at low frequency (semi-permanent) data, such as ISDN subscriber and access data; and (2) a pessimistic technique, for data with a high frequency of update (transient data), such as call processing data describing "busy-idle" states.

Optimistic processing means that the check point for collisions between transactions is at the end of a transaction. The transaction which requests the commitment first receives a positive acknowledgment. Upon collision, the requestor gets an indication for rollback of its transaction with option for restart. Pessimistic processing means that the checkpoint for collision is at the beginning of a transaction where all required data are locked.

Two options are offered to a transaction, namely, access with concurrency control, and access without concurrency control where a client application is not concerned with possible collisions.

(B) Database Access 303

The database access software module 303 supports servers providing read and write access of data. The following two data access functions are supported: (i) generic database access; and (ii) service database access. Generic database access module 322 provides access functions, at the logical level, for basic queries and updates. This module is characterized by all-purpose access routines that are used by applications 301 where fast deployment and the flexibility of data selection is of prime importance. The routines rely heavily on information in data dictionary 304, and have limited scope.

In contrast, service database access module 321 is provided for real-time critical applications. This module has routines which are "intelligent" application-specific routines that implement a sequence of operations on a data group. The routines typically handle "read-modify-write" sequences on semi-permanent and transient data to determine "busy-idle" states.

Data agents 323–325 constitute a physical layer isolating logical objects from the internal implementation of the data structure and access techniques.

(C) Data Dictionary 304

Data dictionary 304 is used to determine relevant data definition and access information—for example, any special handling and data grouping. Dictionary 304 is composed of three tables, namely, the translation tables, the definition tables, and the location tables. Access to dictionary 304 is through procedure calls.

Thus, the DDBMS software supports distributed transparencies through the handling of views in sequencer 305, through distributed transaction processing/control 306, and through data dictionary 304. Also, the DDMBMS software supports structure transparency through the database modules 321–322, through the data agents 323–325, and through the data dictionary 304.

INTERMEDIATE DESCRIPTION

The description of this section has a two-fold purpose, namely, to expand on the architectural arrangement as well as the major components of the DDBMS as set forth in the previous Overview Section. The initial focus is on software extendibility through transparency of the application interface (because that is the one of the most visible elements of extendibility), and on software efficiency. Then, the focus switches to a more detailed exposition of the major software modules—the Database Interface, the Database Access, and the Data Dictionary.

This section expands on the design principles of transparency and efficiency by a mapping best illustrated by the following TABLES I and II for transparency and efficiency, respectively:

TABLE I

| Design Principles | System Architecture |
|---|---|
| Functional layering | Architecture layering |
| Service addressing | Communication links |
| Distributed transaction processing | Distributed concurrency/transaction control |

TABLE II

| Design Principles | System Architecture |
|---|---|
| Data grouping | Distributed data organization |
| "Plug in" services | Service database access |
| Software containment | Database tuning and growth |

1. DISTRIBUTED DATABASE PRINCIPLES

The DDBMS is arranged to support the distribution of data across different system nodes. Data distribution is based on a generic model which commences with the definition of data elements called Object Classes; object classes refer to both semi-permanent and/or transient data. Informally, each object class corresponds to a logical data table that may be mapped to a file, or may be further partitioned into several sub-tables, thus resulting in multiple files. Physical copies of the files are then allocated across nodes, and can also be replicated in several nodes. These principles are illustrated with reference to FIG. 4. Referring to FIG. 4, there is shown logical database 401 having five object classes 402–406; the object classes have been partitioned into logical files represented by "A", "B", "C", "D", and "E". These object classes are allocated physical fries in nodes 411–414 by: replicating file "A" as physical files in nodes 411 and 413; allocating physical files for "B" and "C" in node 412; and allocating physical files for "D" and E" in node 414.

The total information on object class definition, data partitioning, and location is contained in the data dictionary, as will be discussed shortly.

1.1 Architecture Layering

Figure 5:
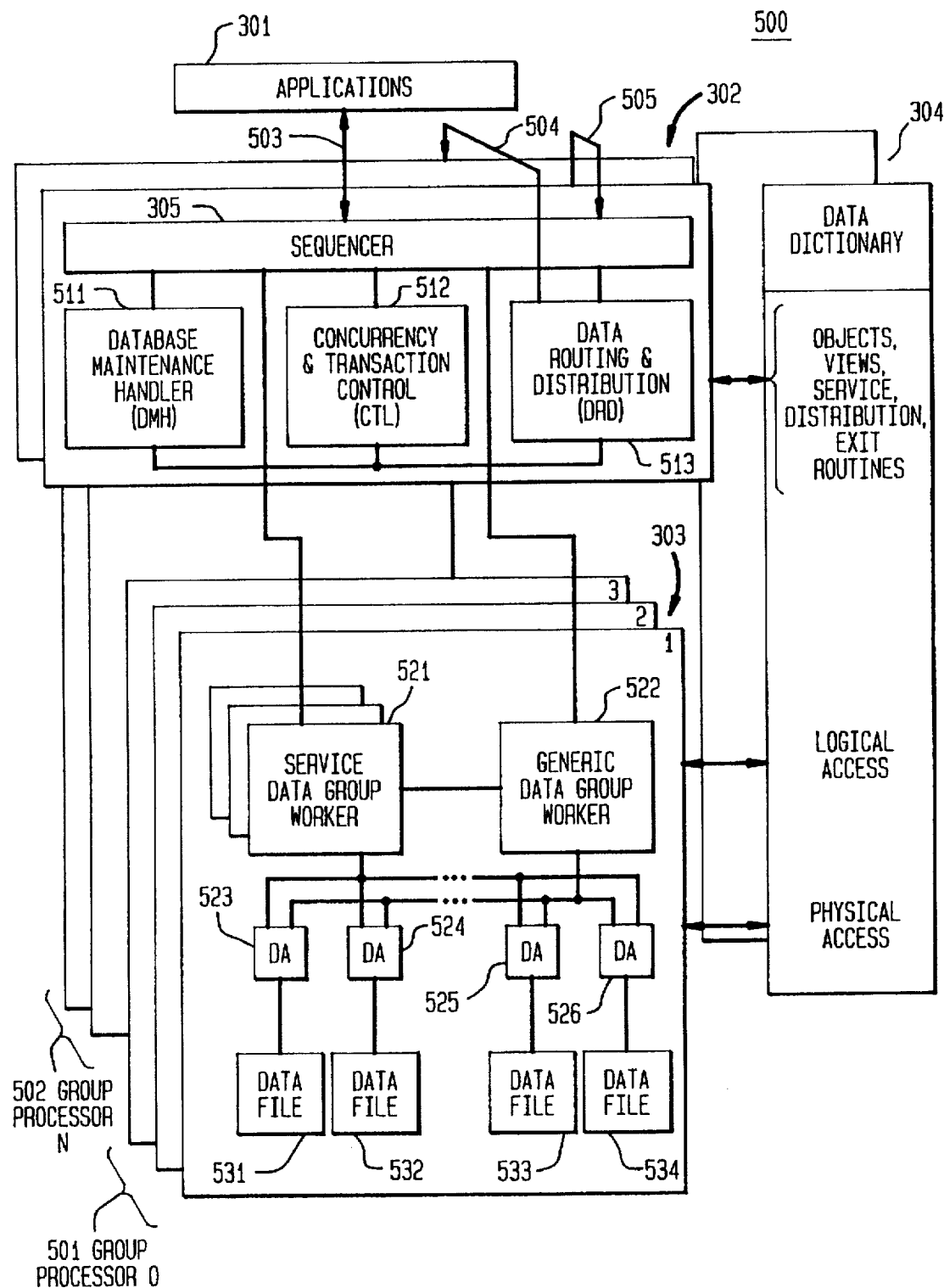
FIG. 5 is an expanded view of the DDBMS of FIG. 3.

DDBMS arrangement 500 of FIG. 5 utilizes a multi-layered architecture which cleanly separates functions to effect true distribution transparencies, namely, service location transparency, data location transparency, fragmentation transparency, and copy transparency. Service transparency permits the implementation details of a server to be changed (e.g., layout of physical data) without impacting the client function. Data location transparency permits the data copies to be migrated across nodes without impacting the client applications. Fragmentation and copy transparencies allow for the changing of different database partitions over time without impact on the client applications. The layering is discussed with reference to FIG. 5, which is a more detailed view of FIG. 3.

In the DDBMS 500, with reference to FIG. 5, well-defined interfaces between the application-server-resource layers are defined by the Data Dictionary (DDI) 304 for optimum flexibility and ease of modification. Service location, data location, fragmentation, and copy transparencies are provided through the Database Interface (DBIF) layer 302, which handles data distribution and views, and through the DDI 304, which captures the needed supporting information to carry out these functions.

A byproduct of layering the architecture is that applications 301 accessing data in the database are not concerned with the physical structure of data. This separation of applications from data structure is fundamental to the flexibility of evolution of the database. The applications see the database at a logical level and thus, the application interface is independent of changes to physical structures—referred to as structural transparency.

The database layer used to provide structure transparency is the Database Access (DAC) layer 303. This transparency is achieved by separating logical data access from physical data access. Logical data access is done through generic database access worker module 522, or service database access worker modules 521. The latter include application-specific routines that are composed of generic database access invocations embedded into specialized algorithms. Physical data access is done through a set of routines called Data Agents (DAs) 523–526. In effect, each application accesses the database through the DBIF 302 using a language based on the standard CMIP. In turn, DAC 303 is invoked using information obtained by parsing the CMIP commands. Thus DBIF 302 offers a published interface to application users in three categories of commands: (1) Transaction Control commands; (2) Generic Database Access commands; and (3) Service Database Access commands.

1.2 Communication Technique

The DBIF 302 supports a communication model for distributed data in order to realize the distribution transparencies. This is accomplished in part using the a so-called Service Addressing technique. With service addressing, the DBIF 302 supports steering of database user commands to target services, and in the case of a set of data organized into multiple data elements, coordinates transactions to all these elements. For example, the DDBMS coordinates data accesses when it updates data across multiples nodes, or when it combines data in order to construct an application view. The result is that, to the applications, the distributed database looks like a centralized database residing entirely in a single "logical" node. The significance is that data can be organized in the distributed database in order to achieve optimum transaction processing performance across multiple nodes.

Where real-time performance is critical, the communication technique for service addressing, coupled with data location information in the DDI 304, allows applications to optimize the data-access communications by routing database service requests directly to the node where the target data resides.

1.3 Distributed Concurrency and Transaction Control

Distributed concurrency/transaction control module 512 provides transaction transparency where a transaction spans multiple data and/or nodes. This control mechanism is implemented in the DBIF 302 layer of the DDBMS. There, commands such as START, COMMIT, END, CANCEL, and RELEASE allow an application to combine several database accesses into an atomic transaction, that is, a transaction that is executed fully or not at all (all-or-nothing). In general, for semi-permanent data, the DDBMS uses this level of transaction control instead of that provided by the operating system of the public switch.

Within a single node, such as node 501 (group processor 0) the pessimistic atomic transaction control supported through the public switch's operating system is used. This transaction control ensures that none or all of the updates are applied to the memory in one atomic, non-interrupted event. In general, the DDBMS uses this pessimistic control for updating transient data. This is implemented in the database access layer 303 through routines in data agents 523–526.

1.3.1 Transaction Control on Semi-permanent Data

Database transaction control ensures that transactions spanning nodes are performed atomically, that is, completed or not-at-all, and it allows internal transactions working on replicates of data to be deferred.

Optimistic transaction control is used to allow parallel read and/or write operations to one database record, or object instance. Collisions between read/write operations to one data-item, or attribute, of an object instance are controlled at commit-point of the transaction control. (It is possible for an application to specify a low overhead (i.e., a light-weight protocol) read of a single object that bypasses optimistic transaction control. This read is invisible to other users and returns data in one atomic read to the requestor.)

A deferred internal transaction capability is allowed in the following circumstances: (i) one or more replicates of data object instances exist in the system, distributed to several nodes; (ii) access to the copy of data known as "master" copy is possible; and (iii) access to one or more of the replicates is not possible.

In the above cases, the master copy and any available slave replicates (i.e., the replicated copies that are not labeled master) are updated, the command requesting the change is positively acknowledged, and the internal transactions that update the unavailable slave replicates are placed in a queue and are executed at a later time when access to the target data is restored.

1.3.2 Transaction Control of Transient Data

Pessimistic transaction control provided by the switch's operating system is used for controlling concurrent database accesses of transient data. This is used instead of the optimistic transaction control because the high rate of updates of transient data. Data conflicts are discovered at the time that access (read or write) to the data is initiated. The database service modules 521,522 attempt several retries before returning a negative response to the requesting user.

1.4 Distributed Data Organization

To provide efficient access to distributed data, data can be grouped based on data relationships and performance of real-time transactions. Two methods of data grouping may be utilized: (i) partitioning where object classes are separated into files; and (ii) replication where an entire file copy is replicated on several nodes.

Partitioning means that object instances associated with an object class can be separated into two or more groups of object instances, where each group can then be allocated on a different node (FIG. 4). Thus, for partitioning, any object instance in one object class exists in a single physical copy, but the copies making up the entire object class may reside on two or more nodes. An example of the use of this feature is partitioning equipment data into groups where the equipment-specific data is allocated on, e.g., group processor 501, where the equipment being described resides. A second example is partitioning subscriber data into groups so they can be allocated on more than one group processor, e.g., processors 501 and 502, when the number of subscribers on the system becomes too large for one group processor to handle the required capacity.

Replication means that any file copy resulting from a partition may be allocated to multiple nodes, thus resulting in replicated or redundant copies. For each file copy, one copy on a specific node (usually a group processor) is designated as a master, which is used for validation of subscriber input information and further distribution and downloading to other group processors or controllers. Other copy replicates are known as slaves. An example of replicated data is translation data which is common throughout the system and is required on every group processor performing call processing.

1.5 Database Access

Two methods of data access are provided, namely, generic and service-specific, as now discussed.

1.5.1 Generic Database Access

A majority of applications access the data through general-purpose data access commands. Generic database access routines provide a flexible library of query and update services such as GET, SET, CREATE, and DELETE. (For instance, for a GET service, a view can be specified as an object class, where the view is defined in DDI 304 as a logical combination of one or more object classes). Data accessed through these commands is specified as a variable list of attributes associated with a data object instance. In FIG. 5, a Genetic Data Group Worker (GDGW) such as module 522 refers to a software unit corresponding to the Generic Database Access module 322 in FIG. 3. Genetic database access is very stable, even over future enhancements to the software, by providing a variable format where any list of attributes can be specified on either a read or write and the mode of the data is implied in the DDBMS (i.e., there are no preset buffer formats supporting a specific list of parameters in a specific order with specific data modes).

1.5.2 Service Database Access

If a data-manipulation need of a real-time application can be satisfied through a centralized service, that is, a service provided through a single node, then a service routing embedding data access operations can be plugged-into the database access layer 303. Any application user can then call this "plugged-in" routine through the database interface 302. Thus, these services are custom-coded routines specified by the applications, but provided within the database access layer 303, and they are single request/response actions. Normally, they involve processing information, such as digit translation, or manipulating data, such as line selection. In FIG. 5, software units or modules corresponding to one or more service database routines are shown as the Service Data Group Workers (SDGWs) module 521.

In this description, the term Data Group Manager (DGM) is used, when clearly understood, to refer to the combination of: all the generic database access functions of module 522; selected service database access functions of modules 521; and selected ones of data agents 523–526. A DGM provides data structure transparency because the data group workers 521,522 offer access services at a logical level and use data agents 523–526 to obtain the actual data at the physical level.

2. DISTRIBUTED DATABASE ARCHITECTURE

Referring again to FIG. 5, DDBMS 500 is composed of three major software modules, namely, Database Interface (DBIF) 302, Database Access (DAC) 303, and on-line Data Dictionary (DDD 304. Briefly, in turn, DBIF 302 is further composed of: sequencer 305; database maintenance handler (DMH) 511; concurrency/transaction controller (CTC) 512; and data routing/distribution (DRD) unit 513, each discussed below. DBIF 302 handles all application requests for database services. From an application viewpoint, communication with DBIF 302 is via an asynchronous message interface on a request/response basis, and DBIF 302 can handle several requests in parallel. DAC 303 is realized as one or more Data Group Managers which, as set forth above, are software groupings which encompass the generic and service database access modules 521,522 and data agents 523–526. Finally, DDI 304 contains the data definition information (e.g., object classes and views), and data organization information (e.g., partitioning and location).

2.1 Database Interface

DBIF 302 is the location where applications/users 301 send requests for database services; it is the functional block that handles distributed transactions, manages concurrent accesses, and coordinates services. Within DBIF 302, sequencer 305 is the service provider for applications/users such as call processing and maintenance managers, as well as other remote sequencers, as indicated by message links 504 and 505 between the visible sequencer 505 in node 501 and another sequencer in node 502. Each sequencer validates user requests by consulting DDI 304, and is the focal point for distribution transparency, using information in DDI 304, and supported by CTC 512 and DRD 513.

Also, using DDI 304, sequencer 305 supports the use of "Views"—pre-defined combination of attributes, from one or more object classes, but invoked as one virtual object class in a user command. Data specified in a View may be organized in separate DGMs and/or separate Group Processors (GPs).

CTC 512 is central to ensuring transaction transparency by supporting a multi-phase protocol. This protocol is used to guarantee that user transactions are atomic, i.e., they have executed completely, or not-at-all. In addition, CTC 512 manages data access conflicts and maintains distributed data consistency across concurrent transactions.

DRD 513 is the module through which distributed database copies communicate. The main component of communication is the service addressing feature of the operating system of the public switch in which DDBMS 500 operates. For transactions that involve cross-references between remote copies, a sequencer in one node interfaces with the remote sequencer through DRD 513 via message links 504 and 505.

DMH 511 supports a variety of internal services for process initialization, data download, audits, error handling, and recovery.

To handle the distribution transparencies, both DBIF 302 and DDI 304 are located on every node that hosts DDBMS 500.

2.1.1 Sequencer

Sequencer 305 serves three primary purposes in the DDBMS:

(1) it is the gatekeeper of the DDBMS, in the sense that it receives and handles all user requests, either from external users or internal DDBMS users, for database services;

(2) it processes user requests under a predetermined priority for each type of request (recovery, maintenance, call processing, concurrency control, administration, and audits); and (3) it coordinates the execution of each user request, from start to satisfactory conclusion, by determining appropriate database service providers—DMH 511, CTC 512, DRD 513, data group workers 521,522, or a remote sequencer—depending on the situation, and by interacting with them.

Sequencer 305 recognizes two essential types of commands, namely, data manipulation and user-controlled transactions.

2.1.1.1 Data Manipulations

Data manipulation commands are requests to generic database access routines 522 and service database access routines 521. From a user viewpoint, the addressable data entity is an object class instance, specified by an object class identifier and a "key".

For each input message, sequencer 305 consults DDI 304 to validate the existence and definition of object classes, views where applicable, attributes, keys and values. Sequencer 305 also determines the location of the needed data files, and whether any special handling is necessary such as, for example, by calling special routines.

If a generic database access command references an object class, sequencer 305 handles the command directly by expanding it into a coordinated sequence of calls to GDGW 522. After execution of the command, sequencer 305 triggers possible exit routines based on information in DDI 304.

If sequencer 305 determines through DDI 304 that an object identifier corresponds to a view, i.e., an aggregation of several object classes, sequencer 305 expands the command into a coordinated sequence of local calls to GDGW 522, to access the local data, and of cast messages to remote DBIFs, to access the remote data. Then, sequencer 305 merges the composite data into a single virtual object according to the application-interface format.

For service database access commands, sequencer 305 builds a frame, and within this frame, it calls the corresponding SDGWs 521 based on information in DDI 304. Sequencer 305 only controls the return code and the calls to possible exit routines.

2.1.1.2 User-Controlled Transactions

Input messages exist that allow the user to define transactions, and to request concurrency and transaction control services using a multi-phase protocol; this is also referred to as a heavy-weight protocol because of the overhead associated with it. Sequencer 305 interacts with CTC 512 to support user-controlled transactions. The technique of multi-phase commit protocol is discussed below when CTC 512 is discussed. Sequencer 305 identifies a user-controlled transaction by a START_TA/END_TA envelope. Coordination of such a transaction involves: (i) expanding it, then stepping through a sequence of calls to GDGW 522, and east messages to remote DBIFs when accessing remote data is required; (ii) several times in the process, telling CTC 512 to log information about specific database access operations—this allows CTC 512 to build a history of the transaction that can be used later to detect collisions; and (iii) interacting with CTC 512 through the multi-phase protocol, leading to the successful execution, or commitment of the transaction, or an indication from CTC 512 that the transaction must be repeated.

2.1.2 Concurrency and Transaction Controller (CTC)

The methods for concurrency and transaction control are based on the requirements for the Commit-Concurrency-Recovery service element set forth in ISO Document Draft International Standard 9804 and 9805. In DBIF 302, CTC 512 offers the services which ensure the consistency of data in the distributed database. For any database service, CTC 512 ensures that a user-defined sequence of read and update operations enveloped in a START_TA/END_TA pair transaction is performed in a consistent way, which means that such a transaction transfers the distributed database from one consistent state into another consistent state.

CTC 512 handles the following situations: (i) parallel requests for transactions, i.e., parallel read and update operations for the same database object instance (concurrency); and (ii) node failures and the non-availability of communication paths (recovery).

Guarantee of data consistency requires that all updates of a transaction are done completely over the whole system (commitment), or none of these updates is done (rollback). The multi-phase commit protocol ensures the consistency of the DDBMS. CTC 512 affords two options for access within a transaction, namely, access controlled by CTC 512, and access without control where a client is not concerned without possible collisions. The former is called heavy-weight and is favored for administration with all-or-nothing transactions. The latter is called light-weight and is favored by real-time clients such as call processing.

It is recalled that CTC 512 deals with concurrency of parallel transactions in one of two manners. First, for data updated at low frequency, an optimistic technique is used. Second, for data that has a high frequency of update, a pessimistic technique is used.

2.1.2.1 Optimistic Concurrency and Transaction Control

Optimistic concurrency control means that the checkpoint for collisions between transactions (parallel reads or updates to the same object) is at the end, or commitment phase of the transaction. Therefore, CTC 512 logs any access to any object in a "log book". The transaction which requests the commitment first receives a positive acknowledgment. Upon collision, the requestor gets an indication for rollback of its transaction with an option for restart.

A collision occurs if one of the object instances modified in a transaction is used by another transaction. The following situations are possible:

Read-Read: There is no collision possible in this case.

Read-Write: Transaction TA1 performs a read and requests a commit before transaction TA2, which performs a write. There is no collision, but if TA2 requests a commit before TA1, there is a collision.

Write-Read: TA1 performs a write and requests a commit before TA2, which performs only a read; this is a collision case. If TA2 commits before TA1 requests a commit, there is no collision.

Write-Write: TA1 performs a write and requests a commit before TA2, which also performs a write; this is a collision case. Also, if TA2 requests a commit before TA1, there is a collision.

At checkpoint 'Request for Commitment', collisions are checked for all parallel transactions via the log book of CTC 512. If a collision has occurred, the requestor gets an indication that a rollback of its transaction is necessary, but a restart of the transaction typically solves this access conflict. The optimistic concurrency control is used for semi-permanent data such as the ISDN subscriber and access data, and for transactions spanning nodes.

2.1.2.2 Pessimistic Concurrency Control

Pessimistic concurrency control means that the checkpoint for collision is at the beginning of the transaction where all required data resources are locked. Independent of whether or not CTC 512 controls transactions, updates to transient call processing data such as "busy-idle" that change dynamically are performed through low-level pessimistic concurrency control of the operating system of the public switch whose scope is limited to a single node. In addition, updates of transient data can be embedded within a larger optimistic heavy-weight transaction if requested by an application.

2.1.2.3 Data Distribution and Data Securing

For each transaction, according to DDI 304 definition of the updated object instances, CTC 512 performs the following (assuming that CTC 512 utilizes the transaction and concurrency constructs of the public switch's operating system and file serve for atomic update of data in memory and on the non-volatile store (NVS)):

1) Update of Master Data-file Copies only in memory for object classes with a data dictionary location attribute of 'MEMORY ONLY' only on NVS for objects with a data dictionary location attribute of 'NVS ONLY' consistent update of memory and NVS for all other objects.

2) Update of Slave Data-file Copies

For each updated file, the update on the master file copy defined in the data dictionary is repeated on the slave copies, where identical copies of the same file are replicated, and the locations are kept in DDI 304. Update of slave data is done under transaction control. If the master data is successfully update, but the slave data is not, CTC 512 still responds to the transaction request with a positive acknowledgment, but ensures that the slave data are update later.

2.1.2.4 Concurrency and Transaction Control Functions

The combined operation of sequencer 305 and CTC 512 support user services and internal primitives. Data access primitives are supported through the DGWs 521 and 522 and DAs 523-526. The specific breakdown of exemplary messages and procedure calls are shown in message flow diagrams in the third (last) pass though the detailed description.

The user services are composed of: defining a transaction (enveloped START_TA/END_TA pair); requesting a commit for a transaction; requesting cancellation of a transaction; indicating that a previous transaction is to be released (i.e., the history of the specified transaction is not longer visible to the database).

Primitive functions for atomic transactions are composed of: primitives used by the database access routines (DGWs/ DAs) to build low-level transaction acting on a single object class instance; primitives supported by CTC 512, using low-level calls to DAs 523-526, allowing sequencer 305 to have a client-server interaction with CTC 512 under a three-phase commit protocol. These latter primitives are used to perform the user-controlled commands and may be used in service database access routines.

2.1.3 Data Routing and Distribution (DRD)

The primary function of DRD 513 is to route messages to the appropriate database node where the desired data is located. DRD 513 and DDI 304 share location transparency (for example, DDI 304 supporting directory service, and DRD 513 supporting routing service). Determination of the location of the appropriate data is done by sequencer 305 consulting DDI 304; routing a request to the desired location is then supported through DRD 513.

2.1.3.1 Determining the Location of Data/Service

The determination of the location of data/service is provided by DDI 304 to sequencer 305 and call processing, allowing them to route requests directly to sequencer 305 where the requested data or service resides.

Figure 6:
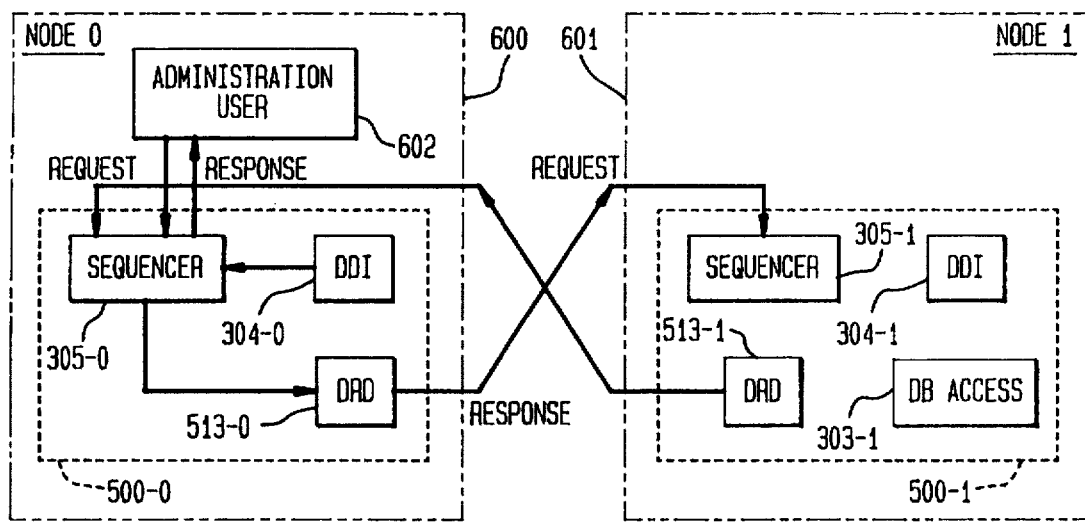
FIG. 6 depicts routing with service/location transparency.

When used by sequencer 305, this direct routing is a standard way to support service/location transparency, i.e., to locate service/data within the distributed database, as depicted in FIG. 6. Referring to FIG. 6, the Administration user 602 in node 600 directs a request to sequencer 305-0 in DDBMS 500-0. Location information is extracted from DDI 304-0, and then DRD 513-0 places a request to sequencer 305-1 in node 601. In turn, DRD 513-1 responds to sequencer 305-0. Finally, sequencer 305-0 returns the desired response, properly formatted, to user 602.

Figure 7:
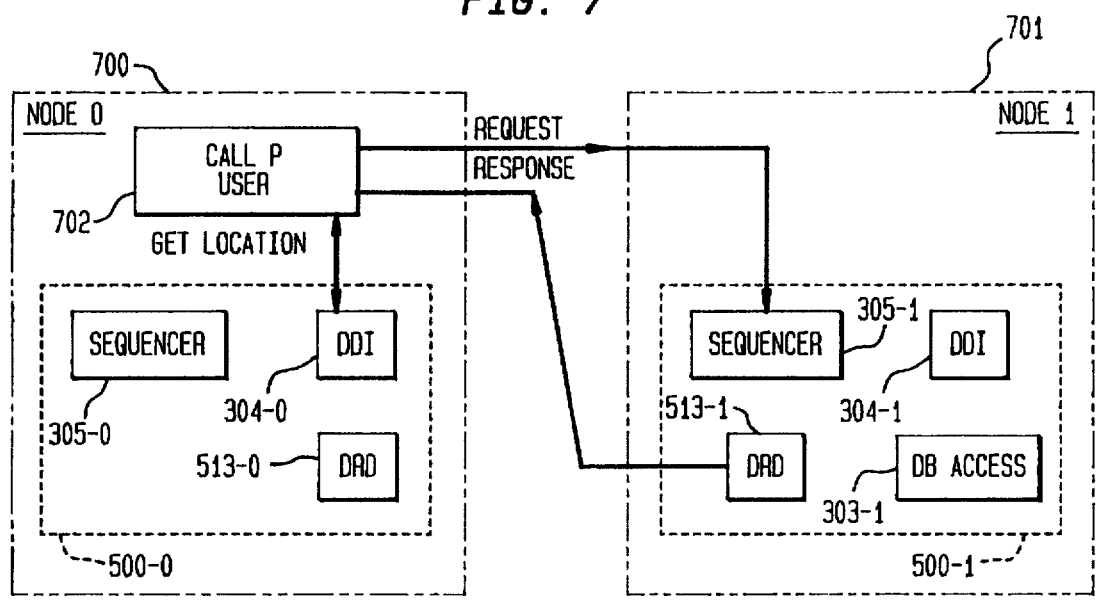
FIG. 7 depicts routing bypassing service/location transparency.

When used by a call processing application, there is an alternative to using service/location transparency, as depicted by FIG. 7. Referring now to FIG. 7, CALLP user 702 in node 700 first obtains location information from DDI 304-0, and then places a request directly to sequencer 305-1 in node 701. In turn, DRD 513-1 returns the response back to user 702 in the appropriate format. This technique minimizes the overall number of heavyweight messages (referred to as Cast messages) for a call processing transaction. Using the location information, call processing users can route requests directly to a co-located, remote database interface.

Determining the location of a service/data is on an object class instance, or service routine basis. The location information is returned to the requestor as a logical node identifier.

2.1.3.2 Routing of Cross-Node Messages

In general, this DRD service can be used by all modules internal to DBIF 302 for routing database messages to appropriate nodes. DRD 513 uses the Service Addressing communication of the operating system of the public switch to pass messages between nodes. DRD 513 provides the capability to route messages to any node.

Any user request to access data is passed to DBIF 302, usually in the DDBMS co-located with the application. Sequencer 305 checks whether the specified operation can be performed locally, based on distribution information in DDI 304 about the object class instance(s) or action object (plug-in routine) referenced.

If the information in DDI 304 indicates that the data resides in a remote node, sequencer 305 invokes DRD 513 to forward the request message the database interface on the appropriate remote node via, for example, message link 504. After execution of the request, the remote database node sends a response message to the requestor DBIF 302 using, for example, message link 505. (It is noted that an update to data must be done first on the node where the master data is located, but a read is possible on any copy of the data, master or slave).

2.1.4 Database Maintenance Handler (DMH)

DMH 511 provides support routines for the recovery, maintenance, and audit processes of sequencer 305. The routines are for data loading, initialization, error handling/recovery, and auditing. In general, the routines of DMH 511 can be invoked by different processes in sequencer 305, but under a well-defined state transition between these processes.

2.1.4.1 Data Downloading

Data downloading uses a flat loading approach where all group processors 501–502 obtain their data files from a file server of the public switch, regardless of whether the data file being loaded is a master or slave copy. The early phases of system configuration contain only a few group processors, and therefore the amount of slave data is minimal. This means that any non-volatile store contention due to multiple copies accessing the file server in parallel is also minimal.

The following are loading characteristics concerning the loading environment:

(1) after all code (including DDI 304) is loaded, the operating system of the public switch initializes a recovery process on each database interface exemplified by DBIF 302;

(2) each database file, resulting from a partition of an object class, is mapped to one logical file on the file server. A file name is mapped to a data agent and a location (e.g., node, capsule) where the master copy of the file resides;

(3) data on the file server is stored on an object class instance basis. Downloading occurs a record (object class instance) at a time, since the physical memory layout in each group processor, even identical upon initial load, may differ over time as updates are applied;

(4) memory-based access tables for each file are generated for the data-access DAs during download. These database-access tables are not necessarily stored on non-volatile store. However, the file server enables random access to individual object-class instances for selective downloading;

(5) the data associated with one object instance is downloaded as one data unit, without the normal checks on attributes performed during updates such as CREATE.

Based on these characteristics, independently on each group processor, the initial load process in sequencer 305 first consults DDI 304 to determine what data must be obtained from the file server, and for each partition of data, what its file name is.

Via the file server, each file is read and loaded into memory, an object-class instance at a time. This loading into memory is a modified create command, using the same procedures for building entries in the access tables, and for dynamically allocating space for each new object-class instance, but verification checks of individual attributes are not done.

Partial downloads are supported via the same mechanism as described above with the difference being that sequencer 305/DMH 511 can request individual object instances or ranges of object instances from the file server.

2.2 Database Access/Data Group Managers (DGMs)

The distributed database is step-wise expandable across multiple nodes on the multi-node processing platform. Data are distributed as data groups across the public switch system in order to optimize throughput and availability.

A data group is a collection of database files, where a file is mapped to an entire object class, or part of an object class as a created by partitioning an object-class as a function of primary key values. A data group is then made up of a combination of whole object classes and object class fragments. Object classes can also be replicated with a single copy appearing in any one data group.

Each data grouping, as previously alluded to, with its associated database access software, forms a logical unit called a Data Group Manager (DGM). The DGM with its components Data Group Workers (DGWs) 521,522 and Data Agents (DAs) 523–526 serves two purposes: (i) it hides details of physical database from the users (structure transparency); and (ii) it is a convenient unit of data allocation; for example, a data group can be allocated, as a whole, to a node, or a software container (e.g., capsule, service provision unit).

Each object class is a data table with "key" and "non-key" attributes, where each key attribute identifies a unique element within the table. At the logical layer of the DGWs 521,522, a data table is composed of three logical parts: 1) the key table provides access to the elements; 2) the indirection table provides a decoupling of the logical keys from the physical record location; and 3) a pool of records which contains the raw data.

At the data agent/physical level, the three different parts assume specific data structures, search techniques, and physical representation in memory.

2.2.1 Database Access Routines/Data Group Workers (DGWs)

DGWs 521,522 operate on an object-class, or tightly-related object-classes, as one logical data table. The DGWs use the DAs 523–526 as follows: (1) search the specified element through a key table; (2) access the relevant record in an indirection table; and (3) decode or encode the attributes of the physical record.

The DGW gets knowledge about the relations between key table, indirection table, and the records of an object-class through the DDI 304. However, the access to an object-class instance is restricted to the scope of the DGM. Specifically, a generic DGW 522 does not have visibility of any data outside its DGM, and a service DGW 521 does not have visibility of any data outside itself.

2.2.1.1 Generic Database Access Routines

The generic DGW provides standard genetic access functions at the logical level for queries and updates. It supports GET, SET, CREATE, and DELETE services for each object-class known by the database. The generic DGW access routines has the advantage of providing a flexible user interface to all of the objects within a DGM. Generic access across DGMs is coordinated through a common view capability in the sequencer.

2.2.1.2 Service Database Access Routines

Service DGWs 521 provide application-specific routines, that combine a sequence of operations on a group of related object-classes. Service DGWs are specified by the users of that service and are optimized to the users requirements. DGWs providing service database access functions are different routines to different users. For example, to Call Processing, they might be real-time efficient event/object combinations; e.g., get all data for a subscriber related to off-hook. To Administration, they might be action/object combinations; e.g., delete multi-line hunt group and all associated data structures such as keys, queues, and terminals.

2.2.2 Data Agents

Data agents 523–526 are at the lowest level of the database and are the fundamental components. The DAs are composed of primitives to access key tables, indirection tables and records, as well as primitives to support CTC (e.g., to detect collisions), and DMH (e.g., for physical audits).

The DAs hide the physical data structures and the search methods from the higher levels (DBIF 302, or DGW 521, 522). In addition, from the DA viewpoint, the elements of physical design (e.g., key table structure, indirection table structure, physical record structure) are isolated and have no relations between one another. The DBIF or DGW use these DA primitives to act on the logical database with no concern for details of physical implementations. The actual implementation through a DA is whatever is necessary to meet the requirements of speed of access, memory usage, etc., as defined by the users of that DA.

DAs appear only to genetic DGWs as library routines with a variable genetic interface, composed of access primitives (CREATE, DELETE, GET, etc.). The referenced database attributes are variable length and number, so new and changed database attributes can be accommodated without interface changes. The configuration of each object-class is defined through the DDI 304.

2.3 Data Dictionary—DDI

The DDI contains the following information:

Object-class description;

Access right information;

Variants information;

Location information;

Logical model dependencies;

Service/exit routines.

The off-line representation of the DDI is a source-code written in a formal Data Definition Language (DDL). The DDI compiler parses the DDL and generates interpretation tables; this is the on-line representation of DDI and it is composed of data modules which become part of each group processor load module.

SYSTEM DETAILS

Figure 8:
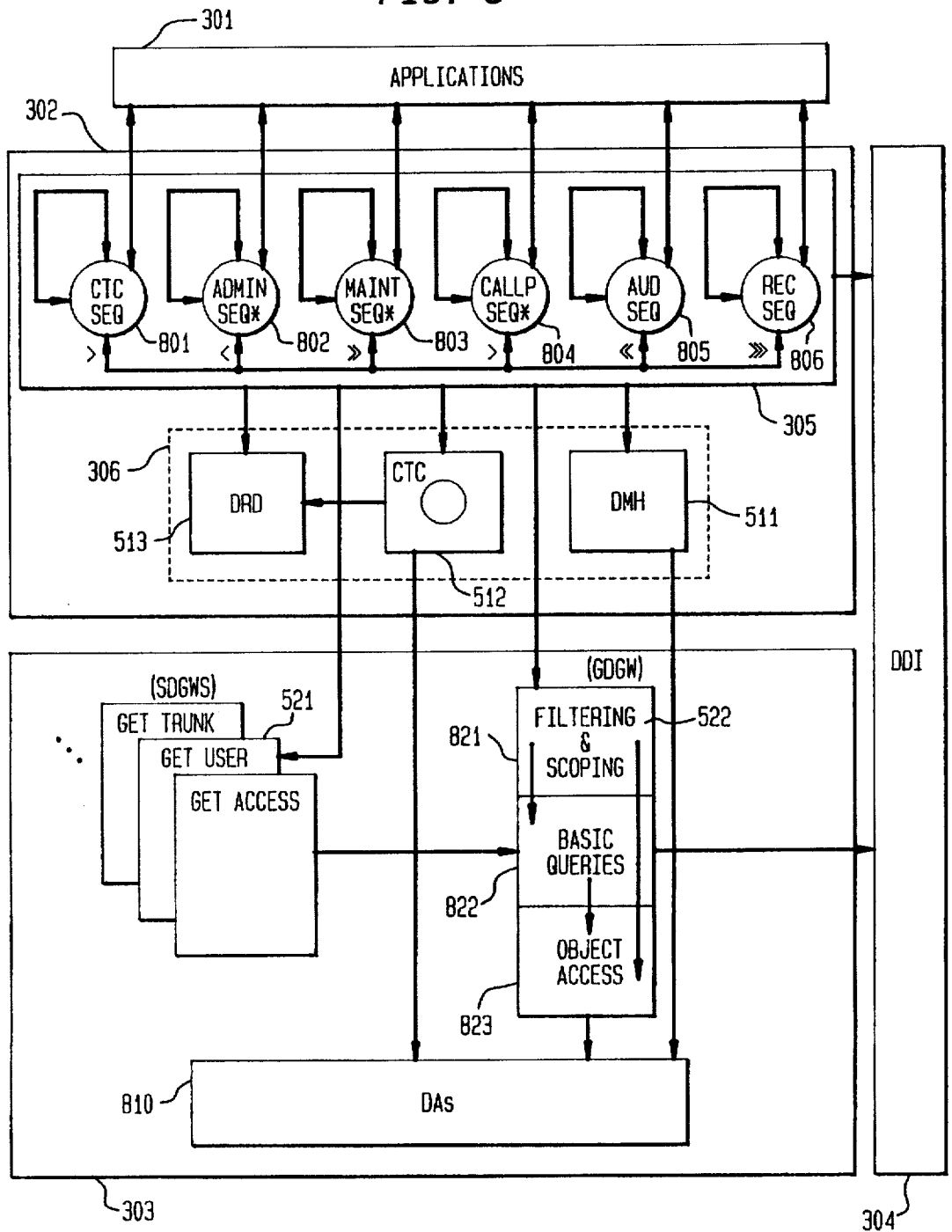
FIG. 8 is a more detailed architectural diagram of the DDBMS depicting the interaction of the database modules along with the corresponding Cast messages, procedure calls, processes and procedures.

This section describes the detailed operation of the DDBMS based on the system architecture presented in the previous section. In particular, this section provides a detailed description of software modules, main services supported in each, and interfaces between them. The interfaces are described through the major DDBMS-internal services (commands) and through sequence-flow diagrams. The block diagram of FIG. 8 depicts, in more detail, the counterpart to FIG. 5. The following convention is used in FIG. 8:

Double arrow indicates CAST message;

Single arrow indicates Procedure Call;

Circles are DBMS Processes;

Boxes are Procedures;

Symbols >>>, >>, >, <, << show Process priorities, where >>> is highest, and << lowest, relative to the priority of Call Processing (>);

An asterisk * indicates a common user-command set.

1. Sequencer (305)

Sequencer 305 of FIG. 8 further subdivides the data manipulation commands into call processing, administration, and maintenance commands, to distinguish between different types of data-manipulation users. Therefore, as a software structure, sequencer 305 is realized as six processes 801–806 according to the types of DDBMS services and user priorities as shown in Table III.

TABLE III

| Process | DBMS Services | Priority |
|---|---|---|
| | Data Manipulation | |
| CALLP/SEQ | call processing | medium |
| ADMIN/SEQ | administration | low |
| MAINT/SEQ | maintenance | high |
| CTC/SEQ | user-controlled transactions | medium |
| REC/SEQ | database startup/recovery | high |
| AUDIT/SEQ | database audits | low |

In Table III, the CALLP/SEQ, ADMIN/SEQ, and MAINT/SEQ processes are functionally identical processes, supporting a common data manipulation capability, but at different priorities. Each of these processes has multiple incarnations; the number of maximal possible incarnations is dependent on the frequency of requests issued by different users. As shown in FIG. 8, each sequencer process can call procedures from DMH 511, CTC 512, DRD 513, DDI 304, Generic Database Worker Group 522, Service Database Worker Group 521, and DAs 810. The processes of sequencer 305 handle user requests by coordinating procedure calls to the listed modules. Commands to sequencer 305 can originate from users external to the DBMS, or from internal DBMS users, that is, from any sequencer process 801–806.

1.1 Command Interpretation

The user commands to the DBIF 302 are logically based on the CMIP standard interface. The variable format of the CMIP messages is built up into a fixed format for messages which are transferred between the users and the DDBMS.

The CMIP operations M_GET, M_SET, M_CREATE, M_DELETE, and M_GET_CANCEL are employed in all of the data manipulation commands used for requests to genetic database access functions.

The CMIP operation M_ACTION is used in some additional data manipulation commands for genetic database access, and in all of the data manipulation commands for requests to service database access, user-controlled transactions, audit, and startup/recovery functions. A flag is used in the M_ACTION message to distinguish between the five categories of commands.

The processes of sequencer 305 handle user requests by coordinating procedure calls to the following software modules: Genetic Database Access DGW; Service Database Access DGWs; CTC; DRD; and DMH.

1.2 Service Database Access Module (521)

For a request to service database access, sequencer 305 processes generate a call to the corresponding service database access routine in module 521 via access to a service routine table (shown later) which is produced at build time in DDI 304. This table contains the corresponding function code and the related procedure names. Service database access routines may call any legal database interface-level command. After execution of a service database access routine, sequencer 305 handles the return code and controls the execution of trigger and exit-routines.

The call to a service routine has a standardized structure and contains at least the following parameters: identification of object class; identification of object key; value of key; list of input parameters (with values); list of output parameters (with values); and return code.

1.3 Trigger and Exit Routines

Trigger routines are user-defined routines associated with object classes, and called upon a REQUEST_TA if that object class was invoked in a transaction. Trigger routines are only allowed to perform generic read requests to the database. To ensure database integrity, sequencer 305 sets a flag before execution of a trigger routine and resets it after execution. The procedures of the generic database access check this flag for CREATE, DELETE or MODIFY operations and reject execution if set. Typically, trigger routines are used to perform certain semantic checks during a transaction, and provide the option of canceling the transaction if a check fails.

Sequencer 305 controls the execution of user-defined exit-routines which are executed after a transaction is complete (after COMMIT_TA). As for trigger routines, exit routines are associated with object classes. Exit routines are used to send autonomous output messages after a transaction is completed.

The execution of trigger and exit routines is possible after generic database access or service database access. Sequencer 305 consults DDI 304 to retrieve information about trigger and exit-routines to be performed by keying on the object classes involved in a transaction. A call to a trigger/exit-routine is done in a way similar to that of a service database access routine in that all trigger/exit routines are listed in a procedure table in DDI 304.

1.4 Views

Sequencer 305 supports system-wide views of attributes belonging to different object classes. Given a user request for a view, sequencer 305 retrieves all definitions for these constituent object classes from DDI 304. Sequencer 305 then synthesizes the view as a virtual object class from the constituent object classes.

Sequencer 305 checks the location of the constituent object class instances and passes messages to partner/remote sequencer(s) to retrieve the appropriate instances of the needed object classes.

After receiving all responses, sequencer 305 combines the values of all attributes needed to build the view, and passes the result to the user as (an) instance(s) of a virtual object class. The view function is restricted to generic database accesses.

1.5 Filtering and Scoping (821)

Filtering defines conditions which are fulfilled while searching. All matches are reported to the requestor. The structure of the output can also be specified by the requestor.

Scoping defines the starting point of the search and the object classes which are accessed with the defined filter. The requestor can specify the mode of response: sorting criteria; and report type (file, memory area, etc.).

Sequencer 305 handles filtering and scoping through generic database access procedures referred to reference numeral 821.

1.6 Other DDBMS Services

The CTC/SEQ 801, REC/SEQ 806, and AUDIT/SEQ 805 processes handle the user requests for concurrency and transaction control, startup-recovery, and audits respectively. These processes coordinate procedure calls to the software modules DMH 511, CTC 512, and DRD 513.

1.7 Access to DDI 304

Sequencer 305 uses DDI-access primitives to retrieve information stored in the DDI 304 about data definitions. Specifically, sequencer 305 consults DDI 304 for information about the following:

Definition of object classes;

Definition of attributes of an object class;

Definition of keys of an object class;

Definition of data representation;

Partition/location information of object instances;

Access-right information;

View information;

Service/exit routines information.

Sequencer 305 uses different types of DDI primitives to retrieve information about object classes. For example, some primitives allow the sequencer 305 to "navigate" along object classes related through "Containment" (also called Name Binding); this is used to derive certain types of views called "hierarchical" views (because those views are composed of hierarchies of basic object classes).

In addition, sequencer 305 uses DDI primitives to validate attributes and keys within object classes. The key values are used to get the partition and location information of object instances of specified object classes.

2. Concurrency and Transaction Control (CTC 512)

CTC functions are performed as procedures, except for the function which controls the preparation of a transaction for commitment; this function is performed as a process. CTC 512 has access to DRD 513 and DAs 810.

Below, an overview of the concurrency control provided by CTC 512 is described through state diagrams for all parameters involved in controlling a transaction. Partners are sub-divided into three categories: (1) application requesting the transaction; (2) coordinator CTC (CTC in the group processor (GP) where the transaction was initiated and therefore the CTC that controls the execution of the transaction; this CTC is in the GP where the transaction first entered the sequencer process of the DDBMS; the coordinator CTC is typically in the same GP in which the application resides); and (3) participant CTCs (all other CTCs in GPs where a master or slave copy of the affected data resides).

The three-phase commit protocol is used to coordinate the update of partitioned and/or replicated data in the distributed database between application, coordinator, and participants.

Figure 9:
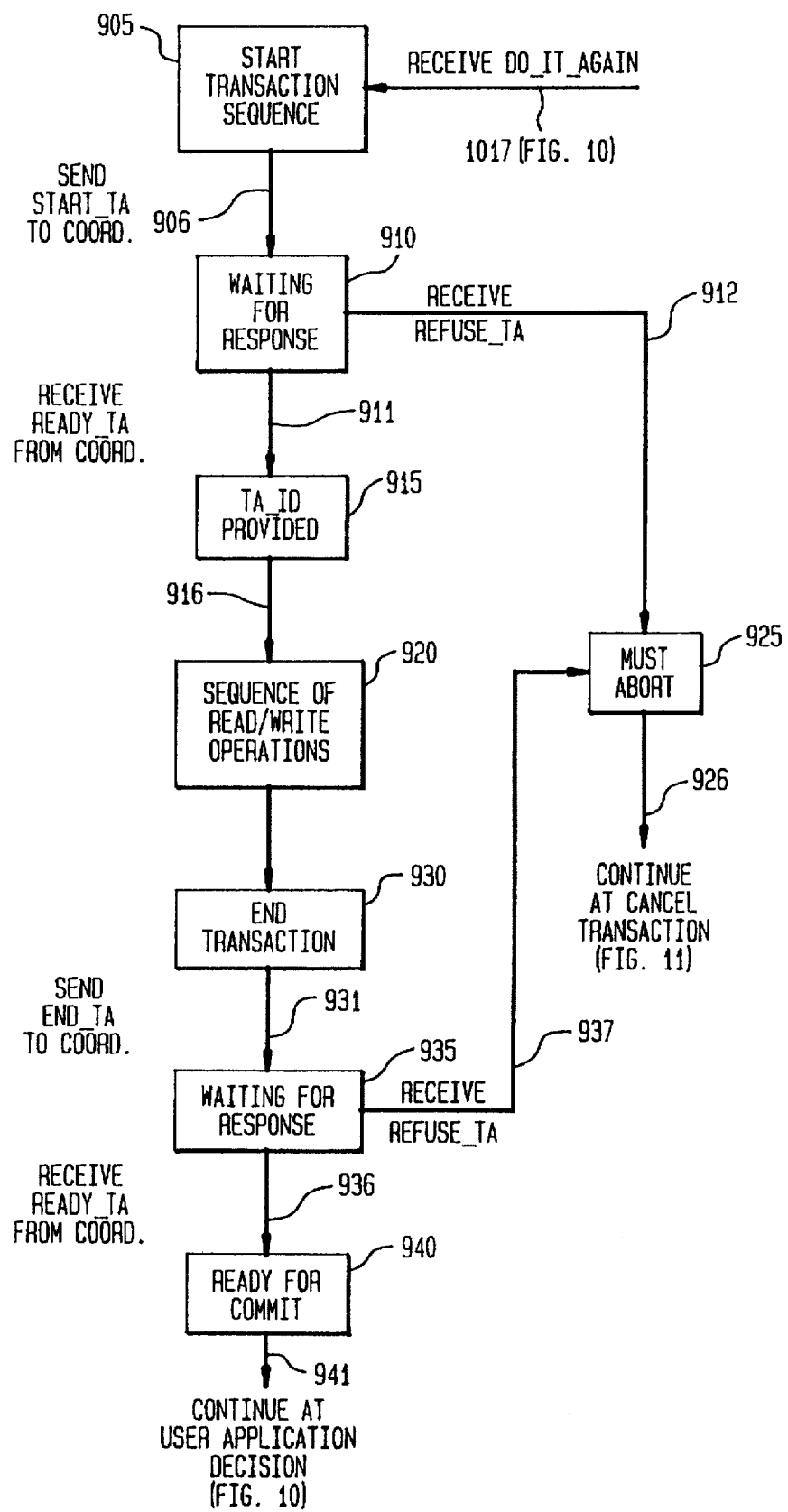
FIGS. 9–11 show the flow diagram for the commit state of the application for optimistic transaction control.
Figure 10:
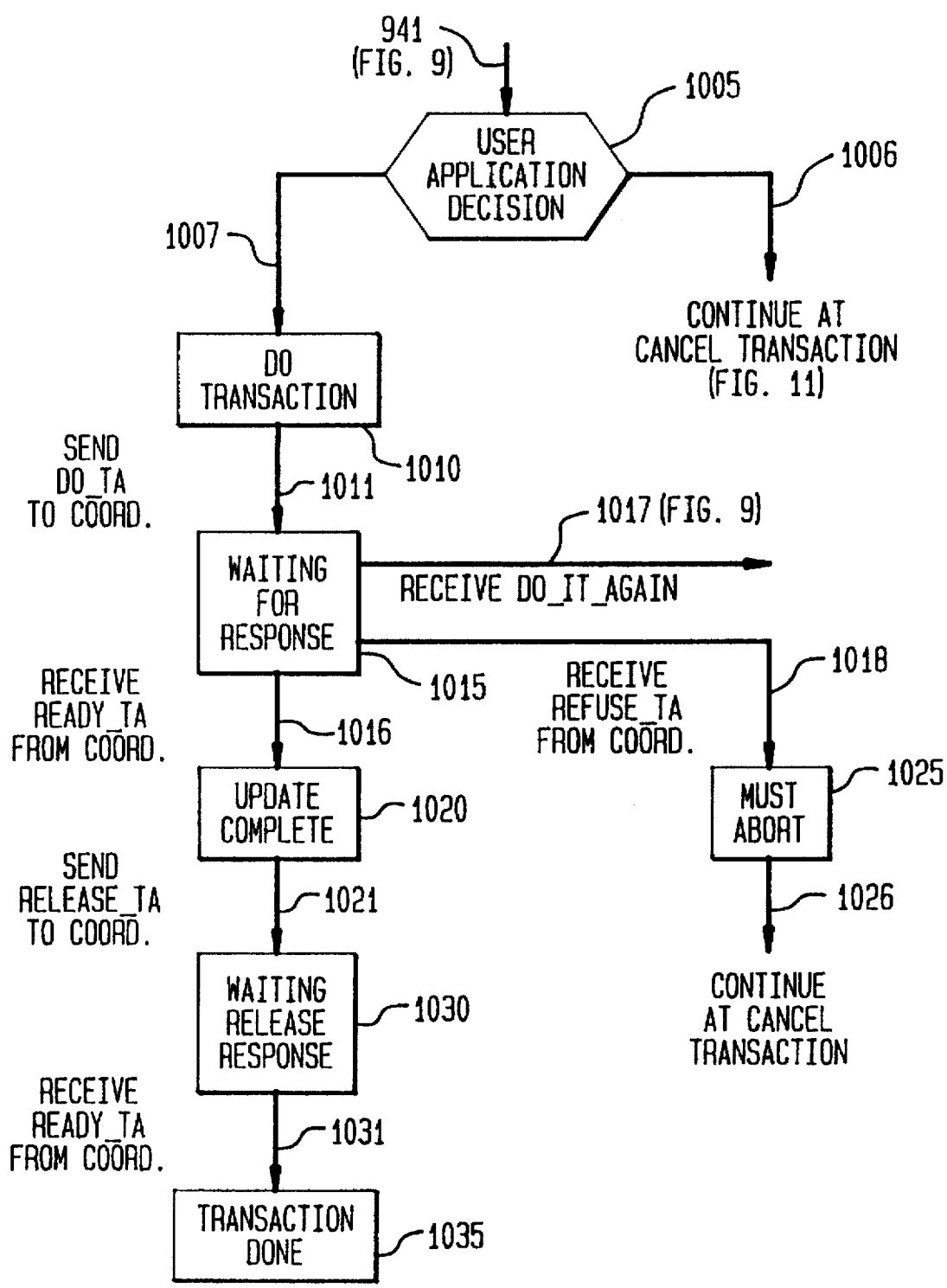
Figure 11:
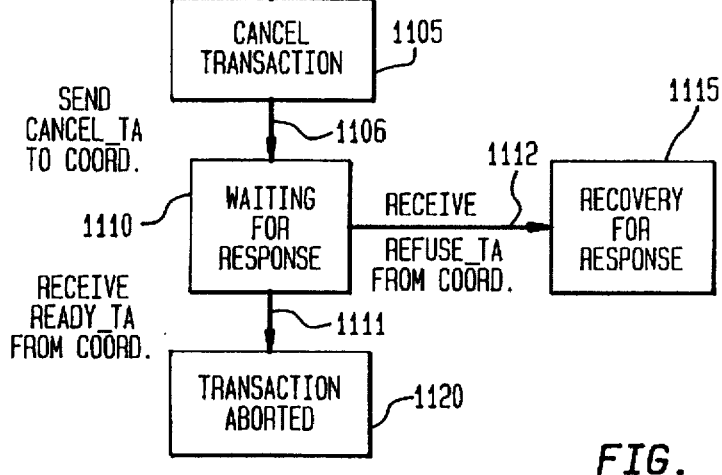
Figure 12:
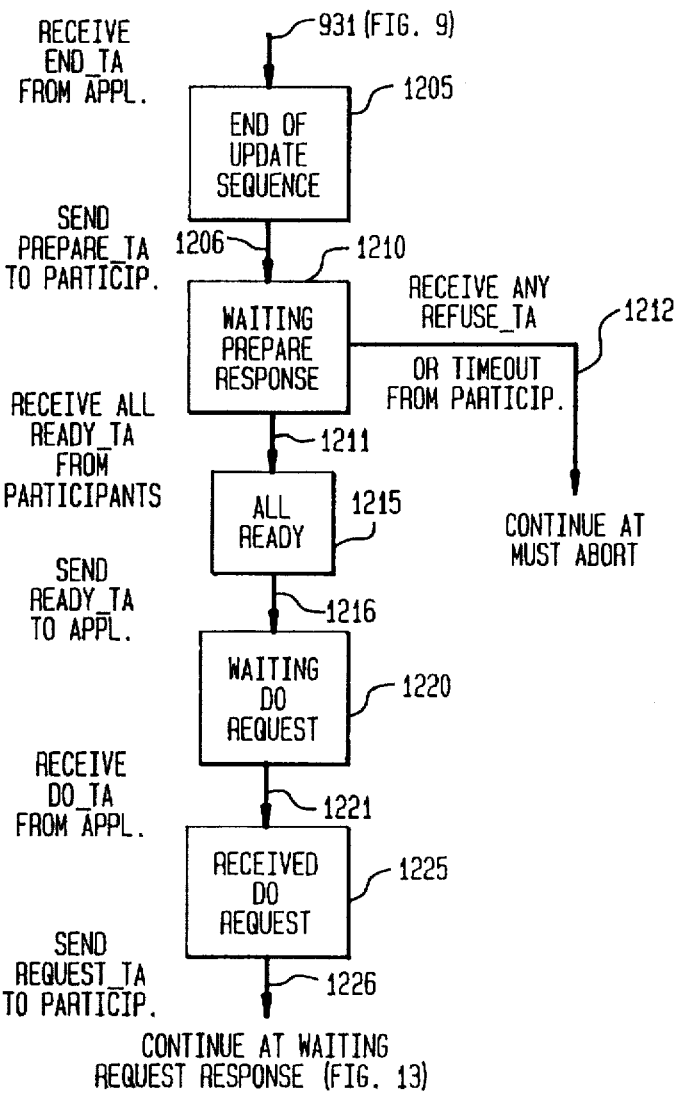
FIGS. 12 and 13 show the flow diagram for the commit state for the coordinator of the optimistic transaction control.
Figure 13:
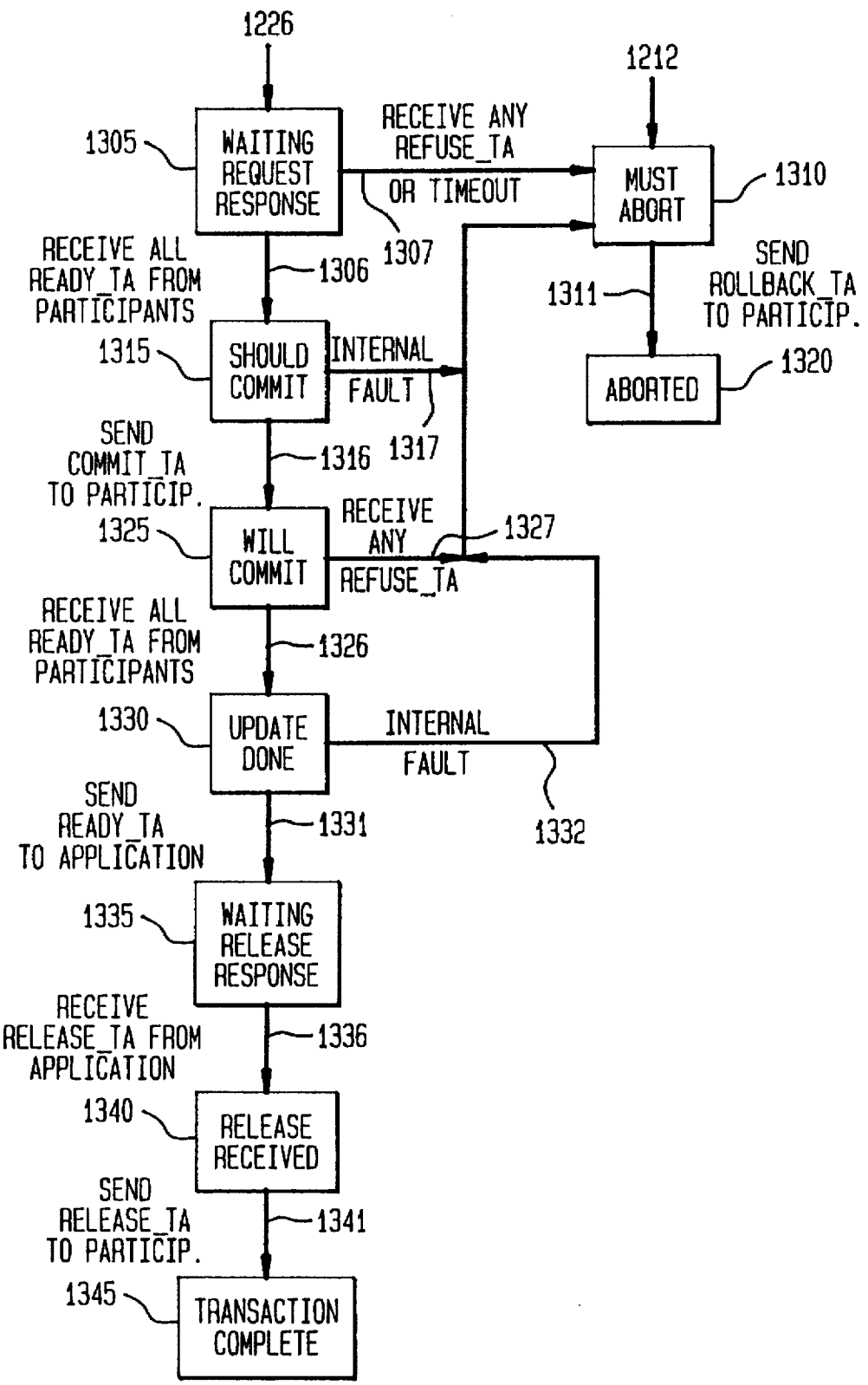
Figure 14:
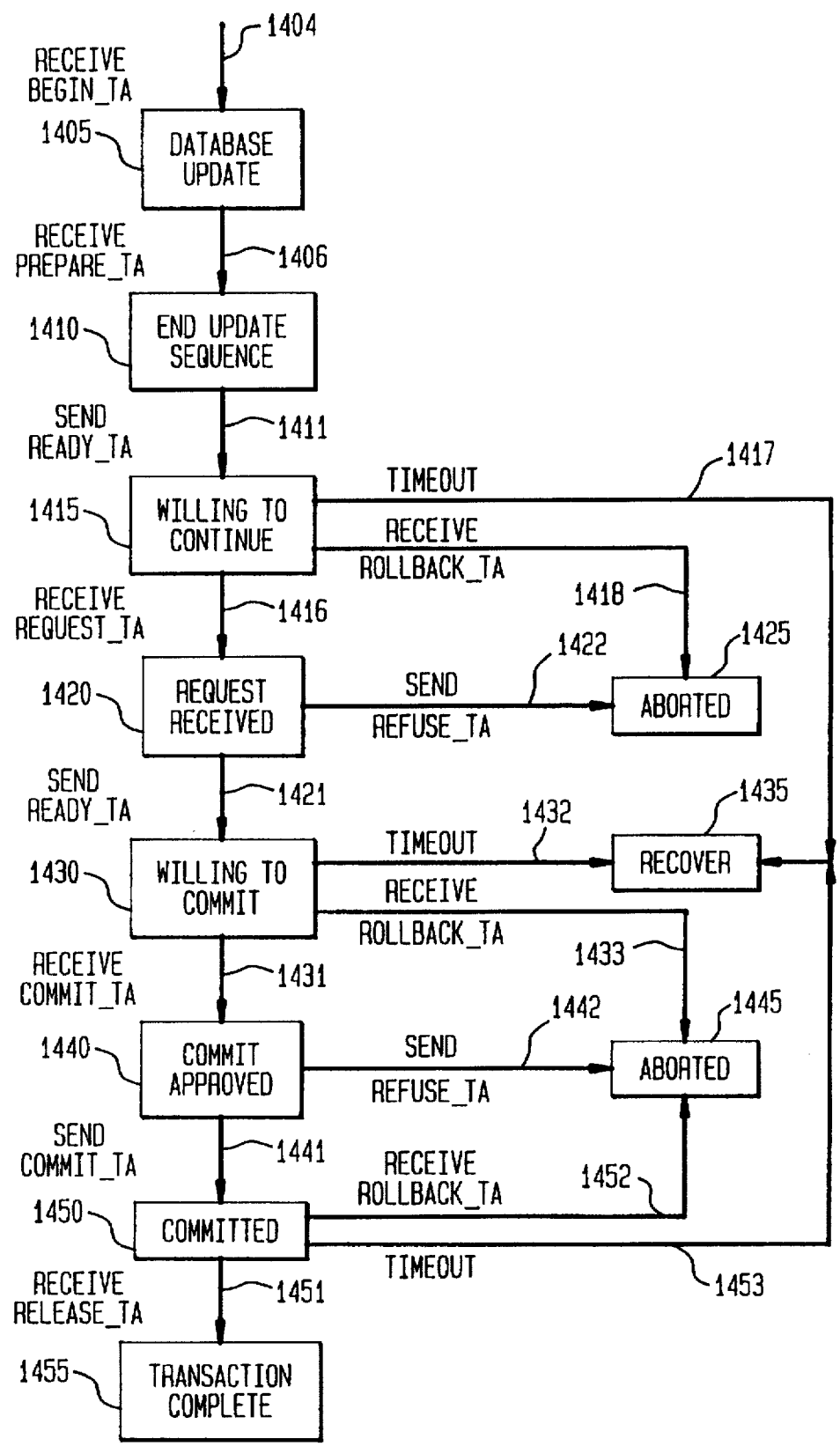
FIG. 14 shows the flow diagram for the commit state for the participant of the optimistic transaction control.

The user messages passed between partners to communicate the states of transaction control are now described with reference to FIGS. 9–14. In particular, FIGS. 9–11 are from the point of view of the application/user, whereas FIGS. 12 and 13 depict the operations of coordinator CTC, and FIG. 14 depicts the operations of a participant CTC. In FIG. 9, the starting point is routine 905 wherein the application has initiated a request to start the three-phase or optimistic transaction control.

2.1 User Functions

The coordinator CTC (say CTC 512) services the application/user functions as follows:

START_TA (lead 906): The application starts a transaction via routine 905. The coordinator CTC, after processing (routine 910), normally responds with READY_TA (lead 911) to provide a transaction identification (TA_ID) (routine 915), unique over all transactions in the public switch. This identification is an input to the CTC for all generic database accesses to map the selected actions to the transaction. It is possible to also issue and REFUSE_TA (lead 912), whereupon the transaction begins an abort routine (925). Presuming a normal response, the application invokes a series of Read/Write operations (block 920) and indicates, via routine 930, that the transaction is fully defined, as now described.

END_TA (lead 931): This indicates that the transaction is fully defined. The coordinator CTC responds with:

READY_TA (lead 936) or

REFUSE_TA (lead 937): this indicates a lack of resources (e.g., no memory available, disk access error, data link error, memory access error, etc.), unknown transaction identification, etc.

The application is now in a position to commit (routine 940), whereupon decision block 1005 of FIG. 10 is entered. If the decision is not to commit, then the transaction is canceled by entering routine 1105 of FIG. 11. However, if the decision is commit, then routine 1010 is invoked as follows:

DO_TA (lead 1011 of FIG. 10) This is a request to commit a transaction. Coordinator CTC 512, after executing routine 1015, responds with:

READY_TA (lead 1016); or

REFUSE_TA (lead 1018): this indicates that the transaction is not known, a lack of resources, END_TA was not performed, or END_TA was performed with a REFUSE_TA indication, so an abort is initiated (routine 1025) and carried out by routine 1105 of FIG. 11; or DO_IT_AGAIN (lead 1017): this indicates a collision with another parallel transaction, but a repetition of the transaction may solve the collision, so routine 905 is again invoked.

Presuming READY_TA is received, the application completes the update via routing 1020, whereupon RELEASE_TA (lead 1021) is issued to the coordinator CTC. After the coordinator CTC responds (routine 1030) with a READY_TA (lead 1031), the transaction is wrapped-up (routine 1035).

If a transaction is to be canceled, then the following is effected:

CANCEL_TA (lead 1106). This is a request for the coordinator CTC to rollback to the database state prior to the START_TA request. After processing by the coordinator CTC (routine 1110), responses are:

READY_TA (lead 1111), whereupon the transaction is aborted (routine 1120); or

REFUSE_TA (lead 1112): lack of resources, unknown transaction identification, etc., whereupon recovery routine 1115 is executed.

To complete the description of the three-phase commit transaction, it is also necessary to describe the flow through the coordinator and participant CTCs, as set forth in FIGS. 12–13 and FIG. 14, respectively.

First, with reference to FIG. 12, the coordinator CTC is initiated upon routine 1205 receiving END_TA on lead 931. Then, a PREPARE_TA indication (lead 1206) is sent to the participant CTC, and an await response routine is entered (routine 1210). The participant CTC responds with either a READY_TA (lead 1211) or a REFUSE_TA (lead 1212) or there is a timeout. In the latter two cases, abort routine 1310 of FIG. 13 is invoked. Presuming a READY_TA is returned for all participant(s), routine 1215 is entered to send a READY_TA (lead 1216) to the application, whereupon the coordinator CTC awaits a Do request (routine 1220). When a DO_TA (lead 1221) is received, a REQUEST_TA (lead 1226) is sent to the participant, whereupon an awaiting request routine 1305 of FIG. 13 is entered. Again, either a READY_TA (lead 1306) or a REFUSE_TA (lead 1307) or timeout response is received. Again, in the latter two cases, abort routine 1310 is invoked. Upon a READY_TA, Should Commit routine 1315 is entered to emit COMMIT_TA (lead 1316) to the participant(s). The participant(s) respond to Will Commit routine 1325 with either a READY_TA (lead 1326) or a REFUSE_TA (lead 1327). The latter invokes abort routine 1310. The former invokes Update routine 1330 and, via READY_TA lead 1331, wait routine 1335 to await RELEASE_TA (lead 1336) from the application. The release is received in routine 1340 which, in turn, sends a RELEASE_TA (lead 1341) to the participant(s). Normal termination is completed by routine 1345. Abnormal termination is completed by abort routine 1320 after a ROLLBACK_TA (lead 1311) is sent to the participant(s).

Referring now the FIG. 14, which is a flow diagram for each participating CTC interacting with the coordinator CTC, the starting point is a BEGIN_TA (lead 1404) into database update routine 1405. Upon a PREPARE_TA (lead 1406) from the coordinator, End Update sequence routine 1410 is entered. A READY_TA (lead 1411) issues from routine 1410 to invoke Willing-to-Continue routine 1415. A normal exit from routine 1415 occurs upon reception of REQUEST_TA (lead 1416), causing a transition to request receive routine 1420; READY_TA (lead 1421) is emitted by routine 1420. The next normal stage is processing by Willing-to-Commit routine 1430, whereupon COMMIT_TA (lead 1430) issues to Commit Approved routine 1440. As a result of routine 1440, COMM/T_TA (lead 1441) is emitted to Committed routine 1450. When a RELEASE_TA (lead 1451) is received, the transaction is completed by routine 1455. A RELEASE_TA on lead 1451 indicates to CTC 512 that a previous transaction is to be released; i.e., the history of the specified transaction is no longer visible to CTC. After a RELEASE_TA on lead 1451, a CANCEL_TA (lead 1106 of FIG. 11) can no longer be performed. Abort routines 1425 and 1445 terminate the transaction whenever ROLLBACK_TA is received from routines 1415 and 1430, or REFUSE_TA from routines 1420 and 1440. Recover routine 1435 attempts to recover from any timeout (leads 1417, 1431, and 1453)

2.2 Transaction Administration and Support

The transaction log book is a cache-heap which contains for each transaction a list of the accessed object instances together with the action (update/read) and the resulting returncode. One transaction begins with 'BEGIN_TA' and ends with 'RELEASE_TA'. The cache-heap is an array with TA_ID (transaction identification) as index.

The TA_ID is built from two components: (1) logical GP-number of group processor where a TA is started (coordinator-GP); in general, this should be a 'capsule ID'; (2) counter unique on GP.

The TA_ID of the coordinator is used on those GPs where a part of this transaction is executed (participant-GP). This rule ensures a system wide unique TA_ID.

3. Data Routing and Distribution (DRD 513)

The DRD software module provides the communication mechanism for routing messages between GPs nodes; the DRD 513 services are performed as procedures.

The DRD is essentially a communication interface between the DDBMS and the public switch's operating-system Service Addressing feature. The DRD on each GP announces all DDBMS services to Service Addressing, and retrieves all unique buffer identifiers of the corresponding DDBMS services on remote GPs from Service Addressing. The centralization of the communication interface to the single DRD module is intended to shield the DDBMS from the implementation of Service Addressing.

The function to provide location information is a procedure made available through the DDI functional block. This procedure can be called via a supervisor call from outside the DDBMS, or a procedure call within the DDBMS, usually via sequencer 305.

4. Database Maintenance Handler (DMH 511)

DMH 511 contains procedures to support the tasks of the startup-recovery and audit sequencer processes (REC/SEQ, AUDIT/SEQ), and to control the return-code. Four major categories of procedures are provided.

The following list of procedures indicate key startup-recovery and audit services of the DMH. Note that, although the procedures below are labeled 'Recovery-support' or 'Audit-support', these procedures can be invoked by either one of the REC/SEQ or AUDIT/SEQ processes.

4.1 Recovery-Support Functions

The major recovery-support functions are:

Process initialization;

Loading of peripheral data;

Selective loading of data (e.g., per object-class);

Database recovery functions;

SWERR (software error report);

Software trap.

At initialization (startup), the DDBMS code is loaded and the REC/SEQ process of the Sequencer is started. The REC/SEQ process on each GP loads the data from non-volatile storage using a LOAD_FILE command. Subsequently, the DDBMS processes (the other sequencer processes, and the CTC process) are initialized using a DB_INIT command.

The DMH provides procedures to recover a consistent state of the DDBMS on all GPs through LOAD_FILE, LOAD_FROM_MASTER, and DISTRIBUTE_TO_SLAVES commands.

4.2 DBMS-Internal Error Handling

DBMS return codes indicate different levels of errors. The DMH provides a procedure to evaluate and handle return codes (HANDLE_RC). HANDLE_RC checks the indication for abnormal execution and may start DBMS-internal recovery actions. Additional procedures are provided to block and free database access for specific users (BLOCK/FREE_OPERATION).

5. Data Group Workers: Generic and Service Accesses

The Generic Database Access functions of module 522 are built as procedures in three different parts: (1) Procedures for object access; (2) Procedures for basic queries; and (3) Procedures for system query support (e.g., filtering and scoping). These procedures are implemented through procedure calls to DA 810 and DDI 304.

Each Service Database Access function of module 521 is built as a procedure. Service procedures can use the DDBMS internal routines of CTC 512, DRD 512, DDI 304, GDGW 522, and the DA 810.

5.1 Object Access (823)

Object access commands are services provided by the DDBMS that allow an application to maintain a session with a particular object class instance. Also, using the transaction-control services, an application may include multiple sequences of object instance sessions, that is, several database object instances may be accessed within one atomic transaction.

Object access commands allow an application to specify object-class instances contained in the DDBMS, and to specify attributes of those instances to retrieve and/or update them.

Three categories of object access commands are included:
1. Announce beginning of access to an object instance:

These commands initialize a working area for the specified object instance, and if appropriate (e.g., a MODIFY object instance command), copies the database record into this session working area.

2 Access to attributes of an object instance:

The GET commands retrieve attributes from the session working area and copy them into the requestor's buffer. The SET commands copy attributes from the requestor's buffer into the session working area.

3. Announce ending of access to an object instance:

This command specifies that no further attribute activity is allowed for the session associated with this object instance. If this session is not included in a transaction, this working data replaces the database data if appropriate, (e.g., a MODIFY object instance), and releases the working area.

To obtain access to an object instance in one transaction, all three commands must always be sent by the application, and must be presented in the order given. Multiple attribute accesses may occur during the session.

5.2 Basic Queries (822)

The DBMS also provides a service allowing a query session associated with all object instances in a group of object classes. Commands are provided to initiate and terminate a query session. Within the query session, the attribute access commands can be used to retrieve or update specific attributes. In addition, a GET NEXT command is provided. The functionality of the GET NEXT command, is related to the structure of the database, which allows an object class instance to be logically viewed as a node in a hierarchy of related object class instances.

Figure 15:
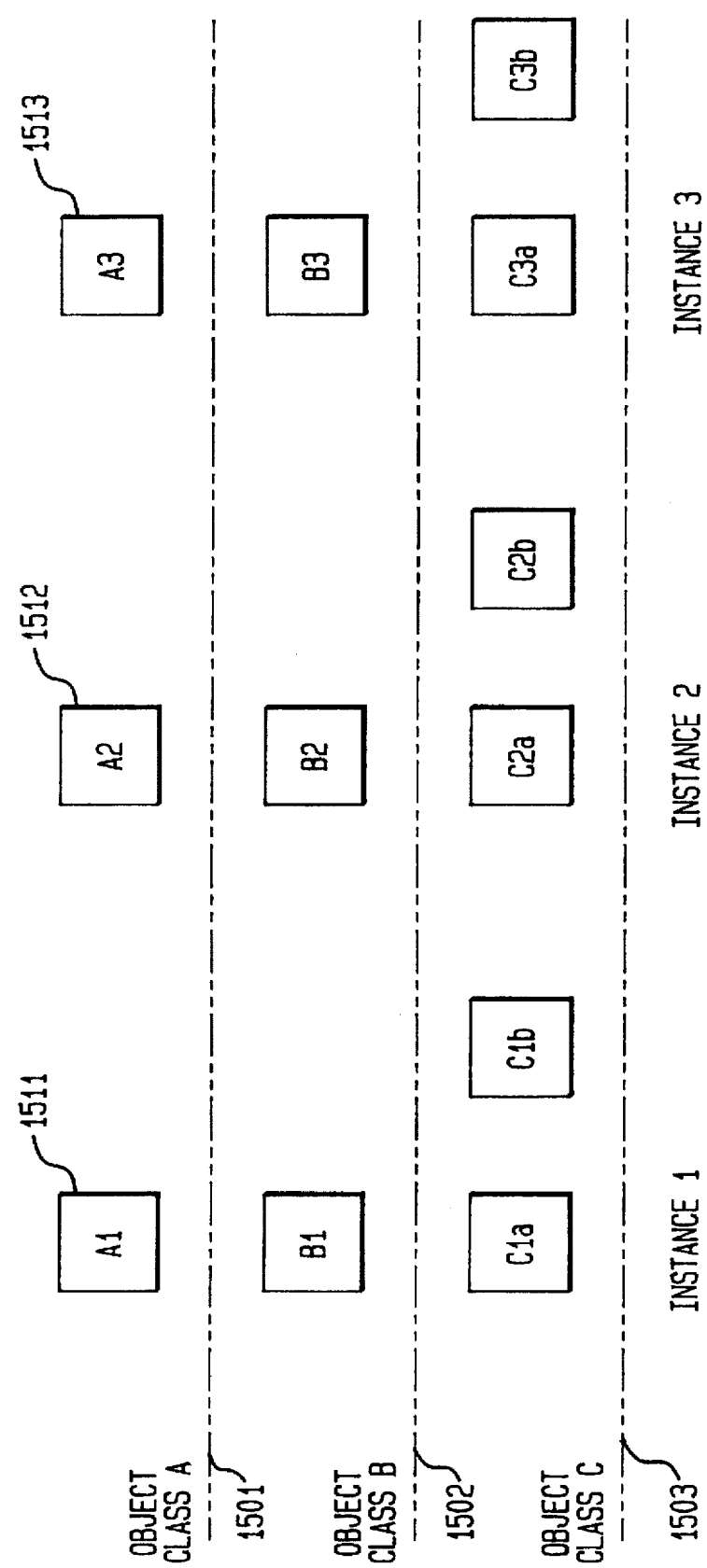
FIG. 15 depicts a layout of instances of object classes.

The interpretation is illustrated in FIG. 15. Assume three object classes 1501–1503 (A, B, and C) are contained in the database. Also assume three object instances 1511–1513 are defined in A (1, 2, and 3, respectively). Associated with data in A1 is data in B1, C1a, and C1b. For example, A could represent subscriber access data. B could represent subscriber directory number data, and C could represent directory number, call type data. The instances 1 through 3 could represent 3 subscribers.

A query session allows an inquiry to begin at a specified object class instance, e.g., B2. From this point, other related object instances can be obtained. This capability is referred to as database navigation. For example, the GET NEXT (down) capability can be used to move down a level in the hierarchy from B2 to C2a. From C2a, a GET NEXT (parallel higher) access can be used to obtain C2b. From C2b, a GET NEXT (up) can be used to move up a level to return to B2, and another move up obtains A2. A GET NEXT (parallel lower) command would move from A2 to A1 and a parallel (higher) command would move from A2 to A3.

6. Data Agents (DA 810)

Data agents 810 are library routines that allow higher-layer users (sequencer 305, GDGW 522, DMH 511, CTC 512) access (typically, read, write, and search) to the physical data representation of object-class instances. Access to the DAs from users external to the DDBMS is strictly forbidden.

Access to physical records is based on generic record-searching and access mechanisms, and a generic data layout capturing records with a varying number of attributes.

The main purpose of the DAs is to provide the transition from logical access to physical access. This transition is performed via a three-level data access structure composed of Key Tables, Indirection Tables, and database records for object instances. DA procedures to access tables and physical records, support the data manipulation functions of the GDGW 522. Other procedures support CTC 512 and DMH 511.

6.1 Data Modeling

Data definition is described in the offline DDI which is translated at compile-time into the online DDI. The DAs provide access to physical data in accordance with the data modeling features allowed by the DDI. But, the DAs are generic routines, and depend only on input parameters that the DGW obtain through the DDI. The DDI supports the following data definition possibilities:

"Containment" of object classes, defined via "name-binding" of these object classes. This results in a hierarchy of object classes where the depth of the tree indicates an increasing level of specialization. Using the DDI, DAs can retrieve the instances of object classes related through containment, without incurring the overhead of direct searches to individual object instances.

"Distinguished names"; i.e., definition of a unique key name (primary key) for each node of a containment tree.

"Alternate keys"; i.e., definition of additional keys (unique or ambiguous) for fast accessing/searching with different predefined attributes.

A list of attributes for each object class; each object instance of this object class can include these attributes. An attribute is a single accessible data item within an object instance, with a defined data representation and different properties (e.g., mandatory/optional and formal defined dependencies between attributes of one object instance).

Each key for an object instance is defined by a sequence of attributes. According to this DDI definition, the model for database access through the DAs is composed of three formal components, namely, Key Tables, Indirection Tables, and Physical Object-Instance Records.

6.2 Key Tables

Key Tables are access tables to the physical representations of object instances. Access to records is based on a search mechanism using a record key value as input. Key Tables are Balanced trees because these are the most time-efficient data structures for data access; further, the access time is calculable. In addition, Key Tables logically connect object classes related through a containment tree. Key Tables include:

pointers to the next lower and next higher key of object instances for the same object class;

a list of pointers to the key tables of the object instances which belongs to the next lower object classes;

a list of pointers to the key tables of the object instances which belongs to the next higher object classes.

6.3 Indirection Tables

An Indirection Table is an access table which is indexed by a key table, and provides a pointer to the physical records of the object instances. This ensures that a simple and robust implementation for transaction support (three phase commitment and optimistic concurrency control) is possible, a third formal component the indirection tables is supported.

In addition, this table has the advantage that alternate key tables are independent from the physical location of records. The indirection tables link the key tables with the physical records in memory.

6.4 Object Instance Records

The object instances, with their actual attribute values, are represented through five different record types:

(1) Record with all mandatory memory-and-NVS attributes of an object instance;

(2) Record with all defined optional memory-and-NVS attributes of an object instance;

(3) Record with all defined memory-only attributes of an object instance;

(4) Record with all mandatory NVS-only attributes of an object instance;

(5) Record with all defined optional NVS-only attributes of an object instance.

According to the storage type, the records are allocated in different memory spaces: (i) semi-permanent area for records which contain memory-and-NVS attributes; (ii) transient area for records which contain memory-only attributes; and (iii) heap area for records which contain NVS-only attributes. Each record contains the following general information:

length of record;

checksum;

timestamp;

variant of object class according to DDI;

update version of record.

For records with mandatory attributes, follows the list of encoded attribute values sorted by attribute numbers. To access the mandatory attributes an offset can be retrieved from a DDI attribute definition table.

For records with optional attributes, a list of occurrences with the actual offset for existing attributes is provided. This information is followed by the list of encoded and existing attribute values.

Therefore, for each object class the object instances are physically represented in the database as a pool of records, an indirection table, one key table for primary keys, and optional additional key tables for alternate keys.

6.5 DA Access Functions

Internally, within the DDBMS, a library of access functions (known as data agents) are defined and made available for use by the other layers within the DDBMS. These data agent functions provide the capability to read, write and search the physical database including separate access to the each of the different levels of the physical database hierarchy.

The users of these data agents include the following functional areas of the database subsystem:

Sequencer processes (CTC/SEQ, CALLP/SEQ, ADMIN/SEQ, MAINT/SEQ, REC/SEQ and AUDIT/SEQ);

CTC within the database interface;

Service Database Access routines;

Generic Database Access routines;

Data Dictionary.

The main purpose of the data agents is to provide the transition stage from the logical access of the database to the physical addressing of the database. This transition is performed via the use of the three-level database hierarchy structure composed of the key-tables, indirection tables and the object class instances (i.e., real database records).

A key table is an internal table defined in the database which provides database users with a mechanism to access the object instances via logical keys. The key table is defined as a balanced tree which by provides a convenient structure for supporting containment classes. There is one key table for the primary key of an object class and (optionally) additional key tables for alternate keys.

An indirection table is also an internal database table which is indexed by the key table and provides an index to the object instance data. This is the type of table which provides the decoupling of the logical keys from the physical database location.

An object instance is a pool of records which represents the physical data area where all of the attributes for a given key are located in the database. This area of memory is indexed from the indirection table.

The following access functions are provided for each of the three levels of the database structure:

Key-Table Access (FIND/ADD/DEL/GET_NEXT KEY);

Indirection-Table Access (GET/GET_NEXT/SWITCH/ADD/DELETE RECORD_ADDRESS);

Access to Records (COPY/CHANGE/DELETE/ADD/LOAD RECORD).

Figure 16:
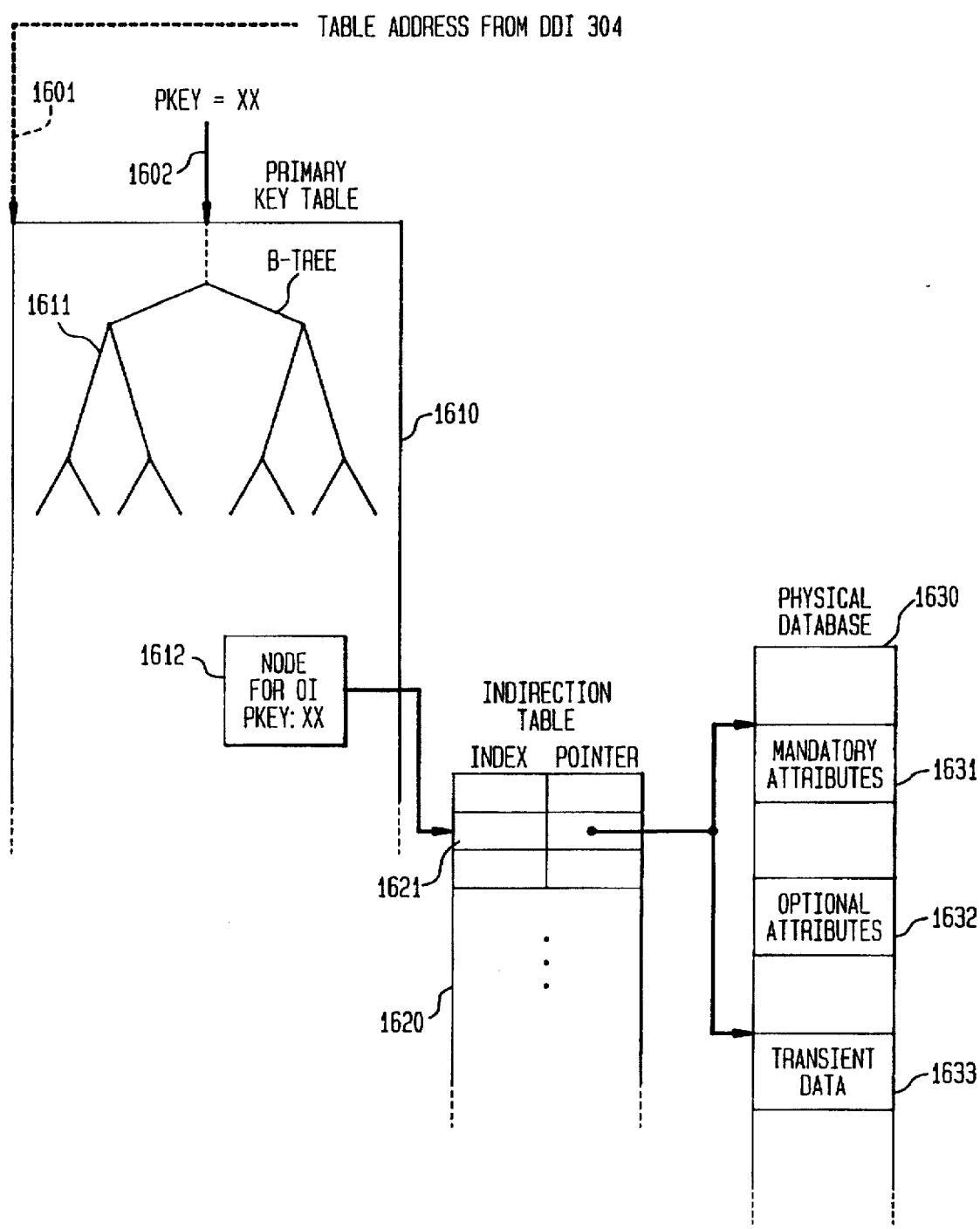
FIG. 16 depicts the relation among the key table, the indirection table, and the physical database.

The diagram of FIG. 16 shows the relation among the key table, the indirection table, and the physical database. In particular, the table address provided on lead 1601 and the primary key (E.g., PKEY=xx) on lead 1602 allow for a search of B-tree 1611. It is presumed that the node located for the given input information is node 1612, that is, an object instance (OI) for PKEY=xx, and node 1612 provides an index into indirection table 1620 at location 1621. The associated pointer at location 1621, points to physical database 1630 and, for the particular pointer, to mandatory attributes 1631, optional attributes 1632, and transient data 1633.

7. Data Dictionary

This section contains some general principles and rules for physical data modeling as captured through the on-line DDI.

7.1 General DDI Principles

The general principles for physical modeling through the DDI are as follows:

1. The on-line DDI is a list of modules which are generated from the DDI compiler;
2. The on-line DDI is linked to each capsule which includes the database (i.e., the online DDI resides in each GP that hosts a copy of the DBMS code);
3. The DBMS provides a library of access functions to the data structures of the online DDI;
4. Each access to the DBMS which is already known at compile time, is based on internal identification numbers for object-class names, attribute names, and symbolic value names (i.e., at compilation of the DDI, the synonyms for all identification numbers are generated and grouped according to each object class). This generation produces a CHILL source which exports the synonyms per object class. The User requiting access to the DBMS, imports the required object class synonym table and can therefore address the parts of the object class via symbolic names. At compile time of the user source, the CHILL compiler translates the symbolic names into ID numbers and therefore ensures the correctness of this interface.
5. For enhancements and corrections it is possible to handle multiple versions of DDI modules to handle the requirements for enhancement.

7.2 DDI Tables

Figure 17:
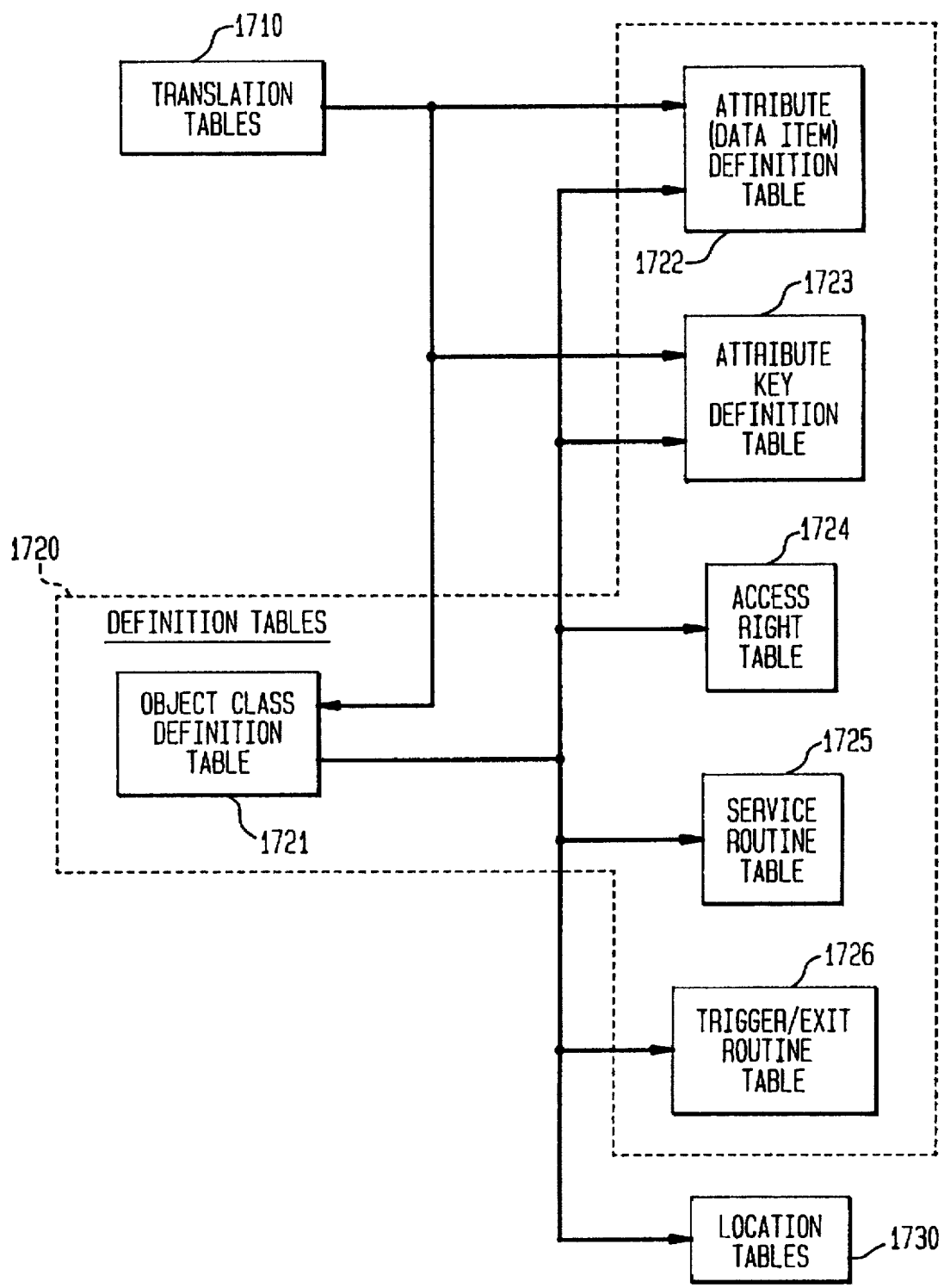
FIG. 17 depicts the arrangement of the data dictionary showing the relation among translation tables, the definition tables, and the location tables.

As shown in FIG. 17, the on-line DDI comprises several tables in three categories: (1) Translation Tables 1710; (2) Definition Tables 1720; and (3) Location Tables 1730.

7.2.1 Translation Tables

The Translation Tables 1710 contain mappings for the following: object names; attribute names; key names; and symbolic names.

The Translation Tables are built as balanced trees for efficient access of the translation of names (strings) into internally used identification numbers; the Translation Tables are necessary on-line to translate administration requests into internally-used identifications.

The rules for translation of symbolic names into internal numbers are as follows:

1. Object class names (strings) into object class identifiers (numbers):

Object class identifiers (numbers) are built from the DDI compiler; these numbers are assigned to the name of an object class by the first compilation of a new object class, remain assigned to this object class during the lifetime of this object class, and are not reused after the potential removal of the object class.

2. Attribute names into attribute identifiers:

Attribute identifiers are built from the DDI compiler according to the object class identifiers. An attribute number is composed of two components: (a) object class number; (b) relative number of an attribute within an object class.

3. Key names into key identifiers:

Key identifiers are built from the DDI compiler according to attribute identifiers.

4. Symbolic names for object-class attributes into symbolic numbers:

Symbolic numbers are built from the DDI compiler according to the offline DDI definition, whenever there is an explicit assignment of numbers there. If not, the DDI assigns numbers itself.

7.2.2 Definition Tables

These tables contain data definition information for the following: object classes; attributes; key attributes; symbolic attributes.

The Definition Tables, composed of attribute definition table 1722, attribute key definition table 1723, access right table 1724, service routine table 1725, and trigger/exit table 1726, contain the total description of the object classes in the database logical model. These tables specify each object class individually, as well as the hierarchical relationships between object classes, also known as name-binding, or containment.

Thus, the Definition Tables capture the containment trees of object classes, the keys, alternate keys, and attributes. The Definition Tables are index-tables with an ID number as key. If the ID number is known, the definition of an object class, key, or attribute, can be directly retrieved from the table with only one access.

For efficient memory usage, an additional indirection table which contains the mapping between the ID number and index into a Definition Table is used. This indirection table defines the existence of a data model entity (object, attribute, or key) in a specific version and variant of the database.

The Definition Tables for object classes contain logical identifiers for Service Routines and Exit Routines optionally specified for each object class. At compile time of the DDI, arrays of procedures are generated as CHILL source, and a logical identifier is used as index into such a procedure array. At build time, the CHILL compiler translates this source code into object modules which are included in the DDBMS service provision units.

Finally, Access-Right Tables list the user processes which are allowed to access specific object classes through specific DDBMS operations.

7.2.3 Location Tables

Location Tables contain mappings between: range (partition element) of object instances to logical nodes (GP, Capsule, SPU, etc.); logical node to object class owned on that node.

8.0 Sequence Flows

Figure 18:
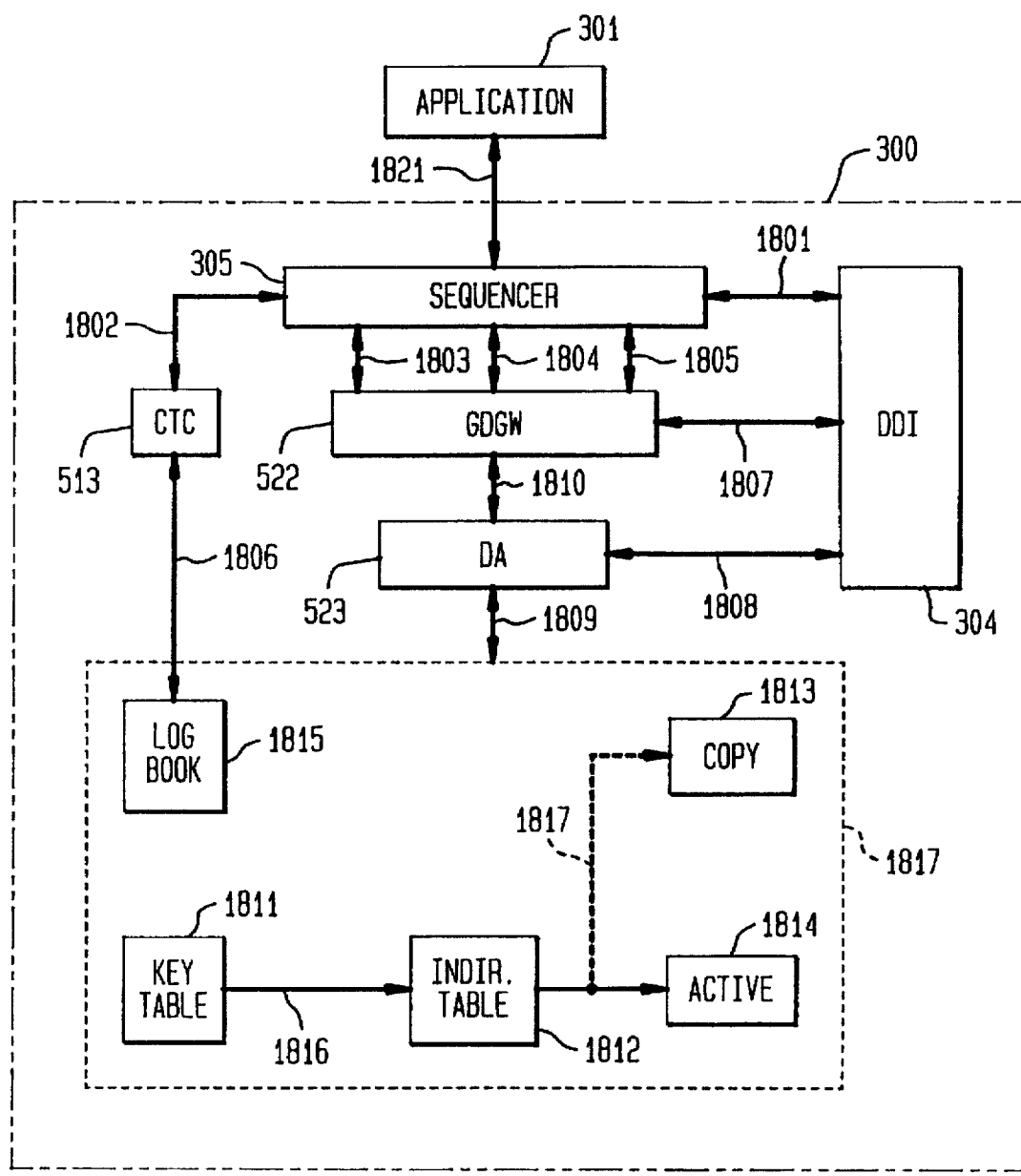
FIGS. 18–19 depict a typical set of message flows relating to call processing usage of the distributed database management system from the perspective of the application.
Figure 19:
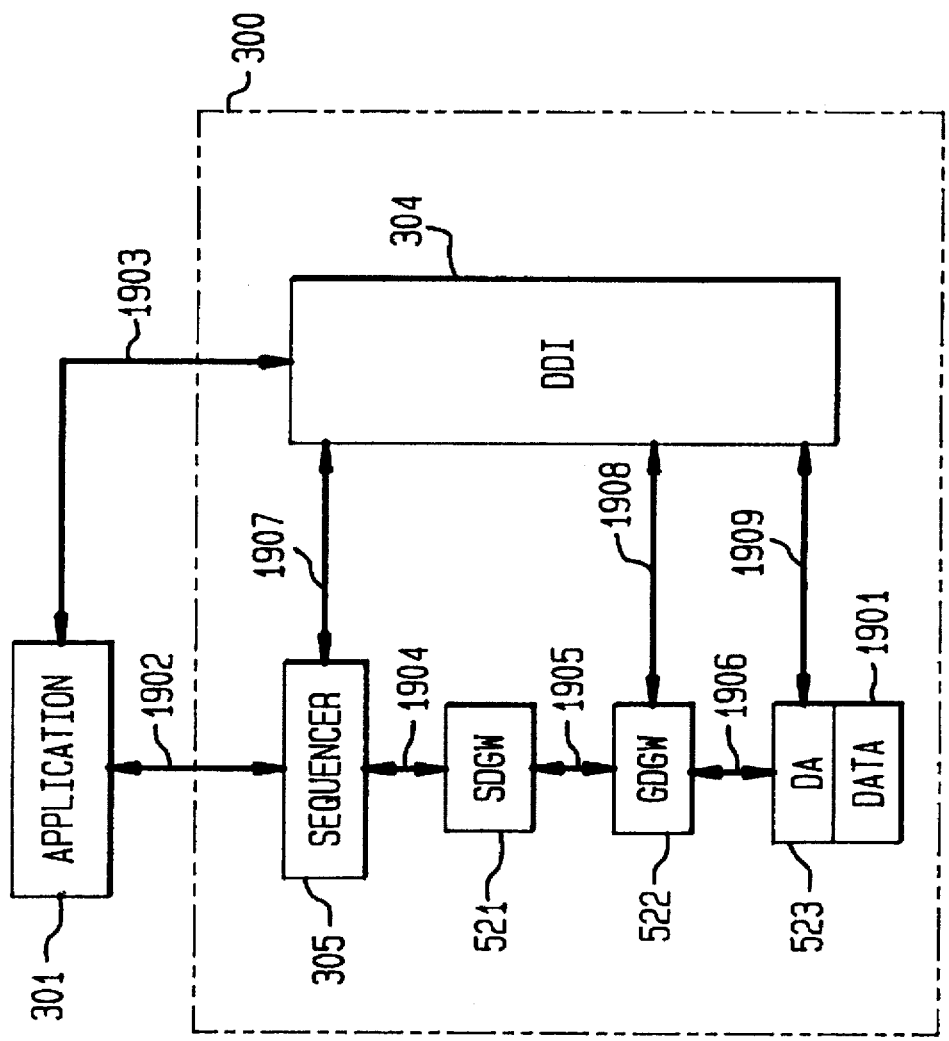

An exemplary set of message flows is depicted in FIGS. 18 and 19 from the perspective of the application showing the interactions of the application with the DDBMS. The particular set of message flows exemplified in FIG. 18 are for a generic database access sequence, and FIG. 19 shows the message flows for a service database access.

With reference to FIG. 18, the application request flows into sequencer 305 of DDBMS 300 via link 1821. This initiates a GET_LOCATION to DDI 304 on link 1801. The transaction processing of CTC 513 is then invoked by sequencer 305 via link 1802. Next, link 1803 between sequencer 305 and GDGW module 522 initiates an request to identify table data. Link 1807 causes a check of the data tables in DDI 304. Link 1810 invokes DA 523 to cause link 1808 to access address information and allocate space in memory 1817. Link 1804 then causes the update of data values, including a check of the correct application identifier over link 1807, and the updating of copy 1813 via link 1808. Link 1805 ends the database operation. Link 1801 is again used to close the transaction and commit, with link 1821 serving to provide the appropriate response.

With reference to FIG. 19, the application request flows into sequencer 305 of DDBMS 300 via link 1902. This initiates a GET_LOCATION over link 1903 between application 301 and DDI 304. Sequencer 105 is then invoked to identify the selected service via link 1907. A call service procedure is initiated in SDGW module 521 via link 1904 between sequencer 305 and SDGW module 521. Link 1905 is then used to read semi-permanent data and transient data as requested by GDGW module 521 accessing DA 523 and data 1901 via link 1906. Links 1908 and 1909 are used as above in FIG. 18 (links 1807 and 1808) to check application identifier and update the copy. Finally, the application response is returned over lead 1902.

Accordingly, it is to be understood that the above-described embodiments are simply illustrative of the application of the principles in accordance with the present invention. Such embodiments which may new be readily devised by those in the art may embody the principles in spirit, and such embodiments are limited only by the scope of the following claims.

We claim:

1. A distributed database management system, arranged cooperatively with a real-time public switching system including a plurality of processors for servicing a transaction request submitted from a switching system application, the distributed database management system comprising a database interface module, responsive to the switching system application, for transforming the transaction request to a database request, said database interface module including a sequencer resident on one of the processors, responsive to the switching system application, for interpreting the transaction request, for locating transaction database data corresponding to the transaction request wherein the transaction database data includes semi-permanent data and transient data, and for generating the database request corresponding to the transaction request, a controller resident on one of the processors, responsive to the sequencer, for executing concurrency control over the transaction database data by jointly applying optimistic transaction control to the semi-permanent data and by applying pessimistic transaction control to the transient data within the same transaction, a data dictionary resident on one of the processors, coupled to the database interface module, for interpreting the database request to extract dictionary data contained in the data dictionary in correspondence to the database request, and a database access module resident on at least one of the processors, coupled to the database interface module and the data dictionary, for processing the dictionary data and the transaction database data to produce a database response and for returning the database response to the database interface module, said database access module including at least one data file containing physical database data corresponding to the transaction database data, the physical database data being grouped in correspondence to at least one service provided by the database management system, said at least one service providing a data access service under a single invocation from said sequencer, and at least one service group worker for executing the corresponding one of said at least one service and for operating on the physical database data with only local procedure calls, said sequencer further including a register listing each corresponding service provided by each at least one service group worker and the location in the processors for accessing each corresponding service group worker, said database interface module, said data dictionary, and said database access module thereby being cooperatively coupled to provide a location for and access to object classes representative of the physical database data in the distributed database transparently to the transaction request whenever such request involves a view of the database requiring the joinder of multiple object classes, wherein said database interface module is further arranged for transforming the database response to a transaction response and for returning the transaction response to the switching system application, and wherein the transaction response controls the public switching system to thereby execute the transaction request.

2. The distributed database management system as recited in claim 1 wherein said data dictionary includes a translation table, accessible by said database interface module and said database access module through procedure calls, which maps physical database data to transaction database data represented by object class names, a definition table, accessible by said database interface module and said database access module through procedure calls, which contains the relationships of each of the object names to others of the object names, and a location table, accessible by said database interface module and said database access module through procedure calls, which maps each processor to object names stored on each processor.

3. The distributed database management system as recited in claim 1 wherein said database access module further includes a generic data group worker for accessing the data dictionary to provide basic query and update access primitives to the transaction database data, and at least one data agent, responsive to the data group worker and each service group worker and coupled to the at least one data file, for accessing the physical database data from said at least one data file.

4. A distributed database management system, arranged cooperatively with a real-time public switching system including a plurality of processors for servicing a transaction request submitted from a switching system application, the distributed database management system comprising a database interface module, responsive to the switching system application, for transforming the transaction request to a transaction database request, said database interface module including a sequencer resident on at least one of the processors, responsive to the switching system application, for interpreting the transaction request, for locating the transaction database data corresponding to the transaction request wherein the transaction database data includes semi-permanent data and transient data, and for generating the database request corresponding to the transaction request within the same transaction, a controller resident on at least one of the processors, responsive to the sequencer, for executing concurrency control over the transaction database data by jointly applying optimistic transaction control to the semi-permanent data and by applying pessimistic transaction control to the transient data within the same transaction, a data dictionary resident on one of the processors, coupled to the database interface module, for interpreting the database request to extract dictionary data contained in the data dictionary in correspondence to the database request, and a database access module resident on at least one of the processors, coupled to the database interface module and the data dictionary, for processing the dictionary data and the transaction database data to produce a database response and for returning the database response to the database interface module, said database access module including at least one data file containing physical database data corresponding to the transaction database data, the physical database data being grouped in correspondence to at least one service provided by the database management system, said at least one service providing a data access service under a single invocation from said sequencer, at least one service group worker for executing the corresponding one of said at least one service and for operating on the physical database data with only local procedure calls, a generic data group worker for accessing the data dictionary to provide basic query and update access primitives to the transaction database data, and at least one data agent, responsive to each group worker and coupled to the at least one data file, for accessing the physical database data on said at least one file, said sequencer further including a register listing each corresponding service provided by each at least one service group worker and the location in the distributed database management system for accessing each corresponding service group worker, said data dictionary including a translation table, accessible by said database interface module and said database access module through procedure calls, which maps physical database data to transaction database data represented by object class names, a definition table, accessible by said database interface module and said database access module through procedure calls, which contains the relationships of each of the object names to others of the object names, and a location table, accessible by said database interface module and said database access module through procedure calls, which maps each processor to object names stored on each processor, said database interface module, said data dictionary, and said database access module being cooperatively coupled to provide a location for and access to the object classes representative of the database in the distributed database transparently to the transaction request whenever such request involves a view of the database requiring the joinder of multiple object classes, wherein said database interface module is further arranged for transforming the database response to a transaction response and for returning the transaction response to the switching system application, and wherein the transaction response controls the public switching system to thereby execute the transaction request.

5. A distributed database management system, arranged cooperatively with a real-time public switching system including a plurality of processors for servicing a transaction request submitted from a switching system application, the distributed database management system comprising a sequencer, responsive to the switching system application, for interpreting the transaction request, for locating transaction database data corresponding to the transaction request wherein the transaction database data includes semi-permanent data and transient data, and for generating a database request corresponding to the transaction request, a controller, responsive to the sequencer, for executing concurrency control over the transaction database data by jointly applying optimistic transaction control to the semi-permanent data and by applying pessimistic transaction control to the transient data within the same transaction, a data dictionary, coupled to the sequencer, for interpreting the database request to extract dictionary data contained in the data dictionary in correspondence to the database request, and at least one data file containing physical database data corresponding to the transaction database data, the physical database data being grouped in correspondence to at least one service provided by the database management system, said at least one service providing a data access service under a single invocation from said sequencer, at least one service group worker, responsive to the sequencer, for executing the corresponding one of said at least one service, for operating on the physical database data with only local procedure calls, for processing the dictionary data and the transaction database data to produce a database response, and for returning the database response to the sequencer whenever the database request invokes said at least one service group worker, a generic data group worker, responsive to the sequencer, for accessing the data dictionary to provide basic query and update access primitives to the transaction database data, for processing the dictionary data and the transaction database data to produce a database response, and for returning the database response to the sequencer whenever the database request invokes said generic data group worker, and at least one data agent, responsive to the data group worker and each service group worker and coupled to the at least one data file, for accessing the physical database data on said at least one file, said sequencer further including a register listing each corresponding service provided by each at least one service group worker and the location in the distributed database management system for accessing each corresponding service group worker, said data dictionary including
- a translation table, accessible by said sequencer and said database access module through procedure calls, which maps physical database data to transaction database data represented by object class names,
- a definition table, accessible by said sequencer and said database access module through procedure calls, which contains the relationships of each of the object names to others of the object names, and
- a location table, accessible by said sequencer and said database access module through procedure calls, which maps each processor to object names stored on each processor, said sequencer, said transaction controller, said data dictionary, and said database access module being cooperatively coupled to provide a location for and access to the object classes in the distributed database transparently to the transaction request whenever such request involves a view of the database requiring the joinder of multiple object classes, wherein said sequencer is further arranged for transforming the database response to a transaction response and for returning the transaction response to the switching system application, and wherein the transaction response controls the public switching system to thereby execute the transaction request.

6. A distributed database management system, arranged cooperatively with a public switching system composed of at least two nodes, each of the nodes being arranged for servicing a transaction request as submitted from a switching system application executing in one of the nodes, the distributed database management system executing in a plurality of the nodes, the distributed database management system comprising
- a plurality of sequencers in correspondence to the plurality of nodes over which the distributed data base management system executes, one of said sequencers being responsive to the switching system application executing in said one of the nodes, each of said sequencers being arranged for interpreting the transaction request, for locating transaction database data corresponding to the transaction request by communicating with the others of said sequencers, wherein the transaction database data includes semi-permanent data and transient data, and for generating a database request corresponding to the transaction request,
- a plurality of controllers in correspondence to the plurality of nodes over which the distributed data base management system executes, each of said transaction controllers being responsive to the corresponding one of the sequencers, and being arranged for executing concurrency control over the transaction database data by jointly applying optimistic transaction control to the semi-permanent data and by applying pessimistic transaction control to the transient data within the same transaction,
- a data dictionary resident in each of the nodes, coupled to the corresponding sequencer, for interpreting the database request to extract dictionary data contained in the data dictionary in correspondence to the database request, and
- a database access module resident in each of the nodes, coupled to the corresponding controller and the corresponding data dictionary, for processing the dictionary data and the transaction database data to produce a database response and for returning the database response to the corresponding sequencer, each said database access module including
  - at least one data file containing physical database data corresponding to the transaction database data, the physical database data being grouped in correspondence to at least one service provided by the database management system, said at least one service providing a data access service under a single invocation from said sequencer,
  - at least one service group worker for executing the corresponding one of said at least one service and for operating on the physical database data with only local procedure calls,
  - a generic data group worker for accessing the data dictionary to provide basic query and update access primitives to the transaction database data, and
  - at least one data agent, responsive to each group worker and coupled to the at least one data file, for accessing the physical database data on said at least one file, each of said sequencers further including a register listing each corresponding service provided by each at least one service group worker and the location in the distributed database management system for accessing each corresponding service group worker, said data dictionary including
- a translation table, accessible by said sequencer and said database access module through procedure calls, which maps physical database data to transaction database data represented by object class names,
- a definition table, accessible by said sequencer and said database access module through procedure calls, which contains the relationships of each of the object names to others of the object names, and
- a location table, accessible by said sequencer and said database access module through procedure calls, which maps each processor to object names stored on each processor, each said sequencer, each said controller, each said data dictionary, and each said database access module in a corresponding one of the nodes being cooperatively coupled to provide a location for and access to the object classes in the distributed database transparently to the transaction request whenever such request involves a view of the database requiring the joinder of multiple object classes, wherein said one of the sequencers responsive to the switching system application is further arranged for transforming the database response to a transaction response and for returning the transaction response to the switching system application, and wherein the transaction response controls the public switching system to thereby execute the transaction request.

* * * * *